(12) United States Patent
Collison et al.

(10) Patent No.: US 9,716,729 B2
(45) Date of Patent: Jul. 25, 2017

(54) SYSTEM AND METHOD FOR TRANSFORMING INTER-COMPONENT COMMUNICATIONS THROUGH SEMANTIC INTERPRETATION

(71) Applicant: Apcera, Inc., San Francisco, CA (US)

(72) Inventors: Derek Collison, San Francisco, CA (US); Philip D. Pennock, San Francisco, CA (US)

(73) Assignee: APCERA, INC., San Francisco, CA (US)

( * ) Notice: Subject to any disclaimer, the term of this patent is extended or adjusted under 35 U.S.C. 154(b) by 0 days.

(21) Appl. No.: 14/203,336

(22) Filed: Mar. 10, 2014

(65) Prior Publication Data

US 2014/0280999 A1 Sep. 18, 2014

Related U.S. Application Data

(60) Provisional application No. 61/785,048, filed on Mar. 14, 2013, provisional application No. 61/785,111, filed on Mar. 14, 2013.

(51) Int. Cl.
*G06F 15/16* (2006.01)
*H04L 29/06* (2006.01)

(52) U.S. Cl.
CPC .............. *H04L 63/20* (2013.01); *H04L 63/08* (2013.01); *H04L 63/12* (2013.01)

(58) Field of Classification Search
CPC . G06F 9/5077; H04L 2209/125; H04L 47/10; H04L 47/125; H04L 67/02; H04L 67/10; H04L 67/28; H04L 67/2823; H04L 69/329; H04L 63/20; H04L 63/08; H04L 63/12

USPC ......................................................... 709/206
See application file for complete search history.

(56) References Cited

U.S. PATENT DOCUMENTS

| | | | |
|---|---|---|---|
| 6,202,157 B1 | 3/2001 | Brownlie et al. | |
| 8,090,850 B2 * | 1/2012 | Roach et al. | 709/228 |
| 8,321,515 B1 * | 11/2012 | Gailloux et al. | 709/206 |
| 8,392,564 B1 | 3/2013 | Czajkowski et al. | |
| 8,463,909 B1 | 6/2013 | Szabo et al. | |
| 2002/0147645 A1 * | 10/2002 | Alao et al. | 705/14 |
| 2004/0193459 A1 | 9/2004 | Delaney et al. | |
| 2004/0240447 A1 * | 12/2004 | Dorbolo et al. | 370/392 |

(Continued)

FOREIGN PATENT DOCUMENTS

| | | |
|---|---|---|
| WO | WO 2007/110094 A1 | 10/2007 |
| WO | WO 2007/141648 A2 | 12/2007 |
| WO | WO2014159270 | 10/2014 |

OTHER PUBLICATIONS

International Search Report and Written Opinion mailed Jul. 30, 2014 in Patent Cooperation Treaty Application No. PCT/US2014/022784, filed Mar. 10, 2014.

(Continued)

*Primary Examiner* — Christopher Biagini

(57) ABSTRACT

A system and method for transforming inter-communications in a computing platform that includes establishing platform policies; isolating components of a platform; channeling communications of a component through a semantic pipeline; progressively processing a communication through stages of the semantic pipeline; and delivering the processed communication to the destination component in accordance with the semantic pipeline.

23 Claims, 21 Drawing Sheets

(56) References Cited

U.S. PATENT DOCUMENTS

| | | |
|---|---|---|
| 2005/0120242 A1 | 6/2005 | Mayer et al. |
| 2005/0138388 A1 | 6/2005 | Paganetti et al. |
| 2005/0226240 A1* | 10/2005 | Hoffmann et al. ............ 370/389 |
| 2005/0254651 A1* | 11/2005 | Porozni et al. ............... 380/270 |
| 2006/0034305 A1 | 2/2006 | Heimerdinger et al. |
| 2006/0036463 A1* | 2/2006 | Patrick et al. .................... 705/1 |
| 2006/0101171 A1* | 5/2006 | Grieff et al. .................... 710/36 |
| 2007/0156659 A1 | 7/2007 | Lim |
| 2008/0060080 A1 | 3/2008 | Lim |
| 2008/0140857 A1* | 6/2008 | Conner et al. ................ 709/236 |
| 2008/0263625 A1 | 10/2008 | Gomez et al. |
| 2009/0083390 A1 | 3/2009 | Abu-Ghazaleh et al. |
| 2009/0320088 A1 | 12/2009 | Gill et al. |
| 2010/0217853 A1 | 8/2010 | Alexander et al. |
| 2010/0306323 A1* | 12/2010 | Gourevitch et al. .......... 709/206 |
| 2011/0023096 A1 | 1/2011 | Xiao et al. |
| 2011/0265168 A1 | 10/2011 | Lucovsky et al. |
| 2012/0005286 A1* | 1/2012 | Bhasin .................... G06F 9/546 709/206 |
| 2012/0198038 A1 | 8/2012 | Porter et al. |
| 2012/0300615 A1 | 11/2012 | Kempf et al. |
| 2012/0324069 A1* | 12/2012 | Nori et al. .................... 709/222 |
| 2013/0117738 A1 | 5/2013 | Livingston et al. |
| 2013/0247133 A1 | 9/2013 | Price et al. |
| 2013/0263209 A1 | 10/2013 | Panuganty |
| 2013/0311778 A1 | 11/2013 | Cherukuri et al. |
| 2014/0129719 A1 | 5/2014 | Weber et al. |
| 2014/0279779 A1 | 9/2014 | Zou et al. |
| 2014/0282849 A1 | 9/2014 | Collison et al. |
| 2015/0082378 A1 | 3/2015 | Collison |

OTHER PUBLICATIONS

P. Cortez et al., "Multiscale traffic forecasting using neural networks and time series methods", Expert Systems 29.2, 2012, pp. 143-155.

A. Khotanzad and N. Sadek, "Multi-Scale High-Speed Network Traffic Prediction Using Combination of Neural Networks", Proc. IEEE Int'l Joint Conference on Neural Networks, 2003, pp. 1071-1075.

P. Barford et al., "A Signal Analysis of Network Traffic Anomalies", Proc. of the 2nd ACM SIGCOMM Workshop on Internet Measurement, ACM, 2002, pp. 71-82.

M. Andreaolini, M. Colajanni, and M. Pietri, "A Scalable Architecture for Real-Time Monitoring of Large Information Systems", 2012 2nd Symp on. Network Cloud Computing and Applications, pp. 143-150.

A. Ghosh and A. Schwartzbard, "A Study Using Neural Networks for Anomaly and Misuse Detection", Proc. 8th USENIX Security Symp., 1999, 12 pages.

\* cited by examiner

```
eyJ0eXAiOiJKV1QiLCJhbGciOiJFUzI1NiJ9.
eyJpc3MiOiJmb29AYXBjZXJhLm1lliwiYXVkIjoiQGFwY2VyYS5tZSIsImlhdCI6MTM
2MjA0NTczMywiZXhwIjoxMzYyMDQ1NzQ4LCJwcm4iOiJ0ZXN0Y3JlYXRland0QG
FwY2VyYS5jb20iLCJwa2V5IjoiQklseUpxZIJRRmFORmtwdnIweIYzNHBRcnpLTVJI
WWRXeFA3c0RjbDBCdi1LTHBSUjJuZVE4TDdoYTJHeU43OUxDYzIfSIVUdnNtbUt
vUEFxMIRnclVjliwiY2xhaW1zIjpbeyJJc3N1ZXliOiJmb28iLCJUeXBIIjoiYmFyIiwiVm
FsdWUiOiJiYXoifSx7Iklzc3VlciI6ImZvb2JhciIsIlR5cGUiOiJmb29iYXJiYXoiLCJWY
Wx1ZSI6Im51dHMifV19.
MEUCIDgai2_PVkPgMFiu_jaqQzbQ82mAGwVIC3fz78DW34uuAiEA_96LmfHeX8Q
suEdB82XgZCOuZs22Lf0CFuR4zs9teWU
```

FIGURE 9A

```
Type: JWT-PK-ES256,
Alg: ES256,
Issuer:auth@EXAMPLE.me,
Audience:EXAMPLE.me,
IssuedAt:1362046030,
ExpiresAt:1362046045,
UserID:instance_manager@EXAMPLE.me,
ProofKey:TY3crM8cey85NKPHNYUtrjqXQLHxqLJd6BHkuVEk6ctfGgCc7KNNEvNt,
Claims:[
{Issuer:auth@EXAMPLE.me Type:auth_type Value:OTP}
{Issuer:auth@EXAMPLE.me Type:auth_type Value:signed_jwt} ]
```

FIGURE 9B

SYSTEM AND METHOD FOR TRANSFORMING INTER-COMPONENT COMMUNICATIONS THROUGH SEMANTIC INTERPRETATION

CROSS-REFERENCE TO RELATED APPLICATIONS

This application claims the benefit of U.S. Provisional Application Ser. No. 61/785,048, filed on 14 Mar. 2013, and U.S. Provisional Application Ser. No. 61/785,111, filed on 14 Mar. 2013, which are both incorporated in their entirety by this reference.

TECHNICAL FIELD

This invention relates generally to the platform as a service field, and more specifically to a new and useful system and method for transparently injecting policy in a platform as a service infrastructure in the platform as a service field.

BACKGROUND

Enterprise applications can be dependent on various teams and policies of those teams. Such limitations results in edge-based development, where policies, libraries, and permissions often have to be worked into the development of any one component. This can require considerable cooperation and effort on the various teams. Furthermore, since the operation and policies of the system are inter-dependent, making any changes can necessitate costly updates to associated components. As another limitation, if a policy is not enforced within an application then there may exist loopholes that can compromise policy compliance. For example, if a library outside of the scope of the platform is used, there may be a way to operate outside of policy compliance. Thus, there is a need in the platform as a service field to create a new and useful system and method for transforming inter-component communications through semantic interpretation. This invention provides such a new and useful system and method.

BRIEF DESCRIPTION OF THE FIGURES

FIGS. 9A and 9B are exemplary representations of a token in encrypted and unencrypted forms;

DESCRIPTION OF THE PREFERRED EMBODIMENTS

The following description of preferred embodiments of the invention is not intended to limit the invention to these preferred embodiments, but rather to enable any person skilled in the art to make and use this invention.

1. System for Transparently Injecting Policy

Figure 1:
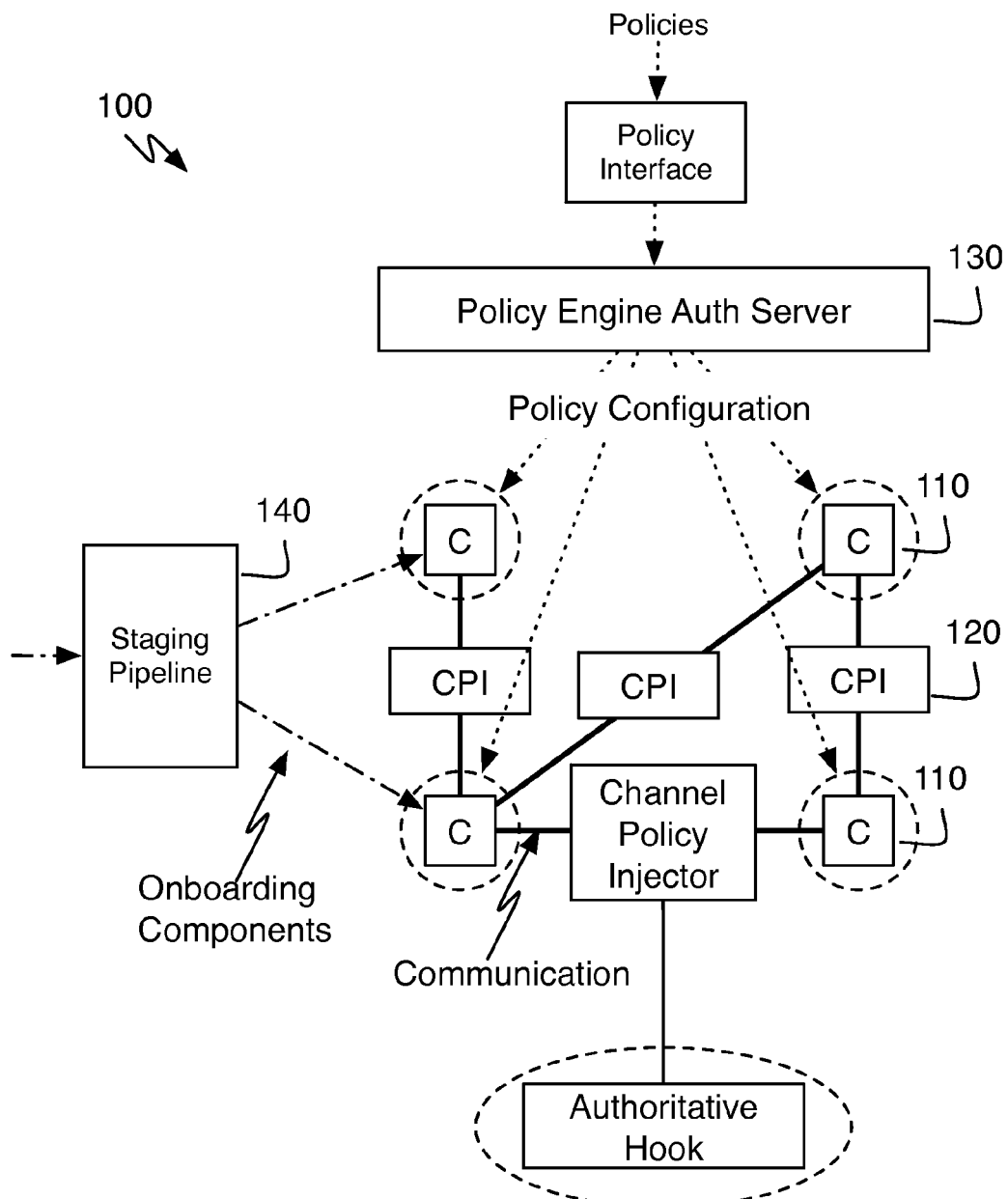
FIG. 1 is a schematic representation of a system of a preferred embodiment.

As shown in FIG. 1, a system of a preferred embodiment for transparently injecting policy in a platform as a service infrastructure includes an application platform 100 that includes a plurality of components 110 interconnected by channel policy injectors 120, an auth server system 130, and a staging pipeline 140. Additionally or alternatively, the system can include a semantic pipeline 150 used in cooperation with the policy engine system. The system functions to create a composable and programmable infrastructure where developers enjoy the flexibility and agility of a PaaS infrastructure while maintaining an enterprise level of compliance, audits, security, visibility, and control. Furthermore, the system enables distributed control of policy so that teams and their corresponding components in the system can be developed and/or governed independently from other teams. The system is preferably communicatively architected to promote pervasive enforcement of policy throughout the full lifecycle of components, including staging, production and updates. The system can function to achieve contextual awareness, control, and enforcement of "who can do what to what" throughout the system. In such an infrastructure, auditing and assurance of policy adherence is promoted through the pervasive enforcement of policy. Components and their respective actions (e.g., with other components) can be held accountable.

In one exemplary scenario, an enterprise solution may depend on components from teams that individually specialize in database management, networking, authentication, policy, and applications. The teams can develop system components independently and can rely on the transparent policy injection of the system to enforce policies that previously required edge-based development practices, which often resulted in delays as teams coordinated the incorporation of policies within various components.

The system preferably abstracts all components 110 of the system to packages and jobs so that each component 110 and inter-component interaction is treated in a similar manner. The components 110 can include a package, which is a collection of files, data objects, or machine-readable data that are used to compose an application or service. Some exemplary packages can include an operating system, a runtime environment (e.g., Java runtime), a capsule snapshot, Ruby on Rails application, a bash script or any suitable package. A service can be defined as a resource that can be consumed by a job. The platform 100 may start and manage a service or the service can exist completely outside of the platform 100. A job preferably defines a unit of work in the platform 100. A job can consist of one or more packages, services consumed (i.e., bindings), routes, and other metadata (e.g., requested number of instances, the state of the job, etc.). Components 110 (i.e., the packages) are integrated into the system in a conforming manner. A component 110 is preferably a network host or computer connected to a computer network. A component 110 could alternatively be a virtual machine connected to a computer network and managed within the computing infrastructure of the system. Communications and inter-component transactions (i.e., jobs) are all passed through a channel policy injector. This thorough and consistent architecture puts a policy eventing layer below actual component implementation. Platform components can be prevented from circumventing policies in part due to having host packet filter rules (e.g., in an instance manager under control of the policy engine) that are controlled from outside of the environment within which the jobs can run (e.g., within an isolation container). This preferably functions to limit external connectivity so that the connection has to have been allowed. In one example, no external network connections can be made without pre-approval. In another example, a TCP diversion via packet-filter rules may silently send the packets onto a semantic pipeline. In yet another variation, the rules may block the default port for a given database and make sure that the real database does not accept connections from the cluster unless the TCP connection is marked with DSCP values. The DSCP values can be restricted so that only trusted components (e.g., not regular jobs) are permitted to set the DSCP values. In one exemplary scenario, one may want to enable system wide auditing. An auditing stage in a semantic pipeline or any policy enforcement layer between components can be enabled, and since all components are architected within the platform with consistent policy injection, transactions cannot escape audit logging enabled in a channel policy injector. Additionally, the abstraction of policy enforcement to a layer above component implementation can function to enable each component to operate independently from other components. As an exemplary benefit, component independence removes much of the logistical red tape involved in releasing an application, especially in an enterprise environment or one in which policy compliance is paramount.

Figure 2:
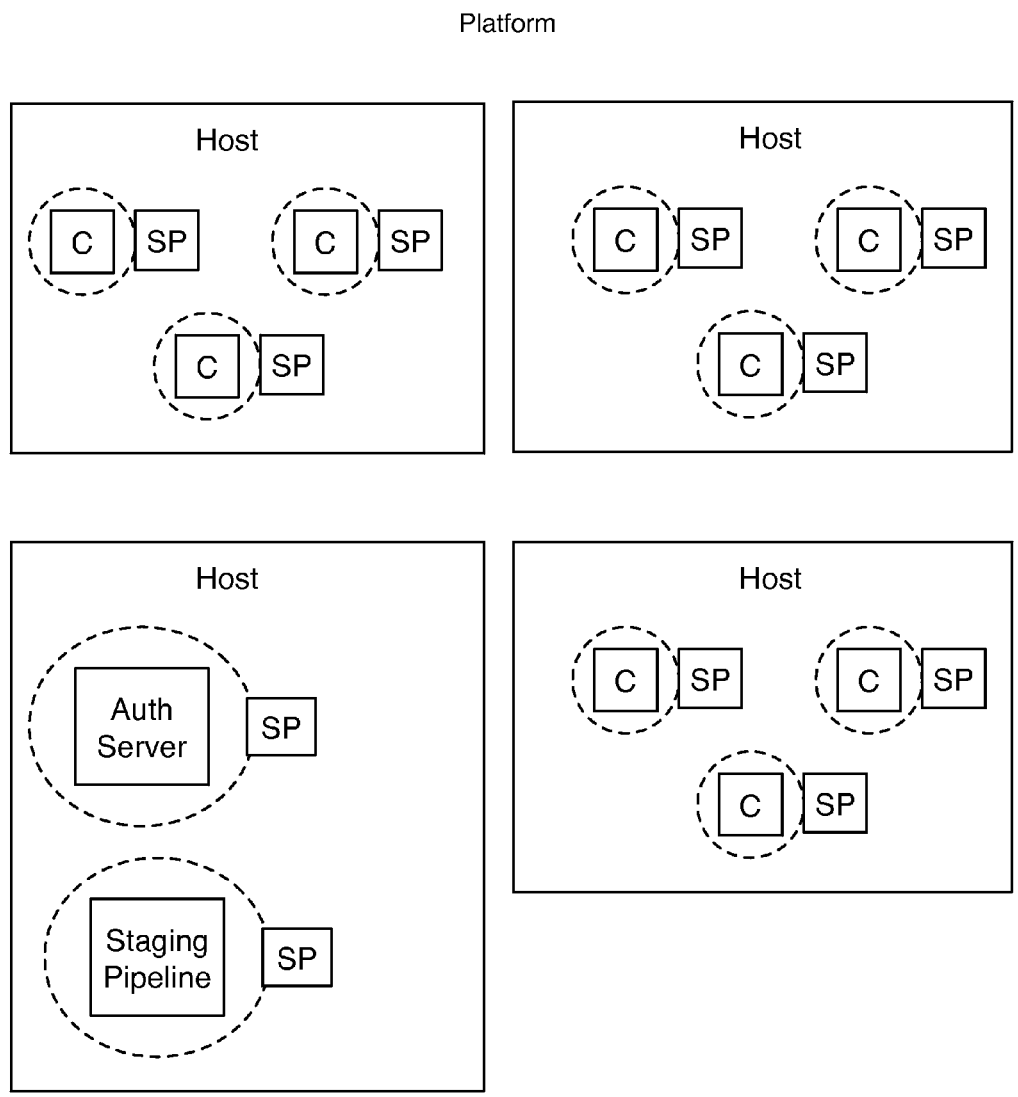
FIG. 2 is a schematic representation of an exemplary platform architecture.

The application platform 100 (or simply "platform") of the preferred embodiment functions to be an infrastructure on which at least one application system is implemented. The platform may be an external publically hosted cloud environment. The platform may additionally be a multi-tenant cloud environment that allows resources of the platform to be shared by a plurality of different users and organizations. The platform may alternatively be an internal/on-premise platform infrastructure deployed and operative within an internal network. The platform can include user-defined components, which are staged within various environments of a user on the computing infrastructure, but the platform can additionally include internal components used in management and architecting the infrastructure. As shown in FIG. 2, the Auth server, staging pipeline along with other user components can all use corresponding policy injectors in enforcing policy, which can be distributed on various host machines. The platform can be utilized in enterprise solutions that benefit from development flexibility while balancing policy and compliance requirements.

The platform 100 is preferably composed of a plurality of components no. The components 110 of the preferred embodiment function as any suitable service or device resource within the computing platform such as network components, servers, storage and other service components. The component 110 may be an application, an operating system, a script, a service, a database, or any suitable resource. A component 110 is preferably implemented within an isolated container mechanism. The isolation container is preferably an operating system-level virtualization implementation (e.g., a Linux container). The isolation container may alternatively be any suitable mechanism for isolating or containing a component. Alternatively, a group of components may be collectively implemented within an isolation container. The isolation container configuration or setup is preferably determined by the policy engine.

Figure 3:
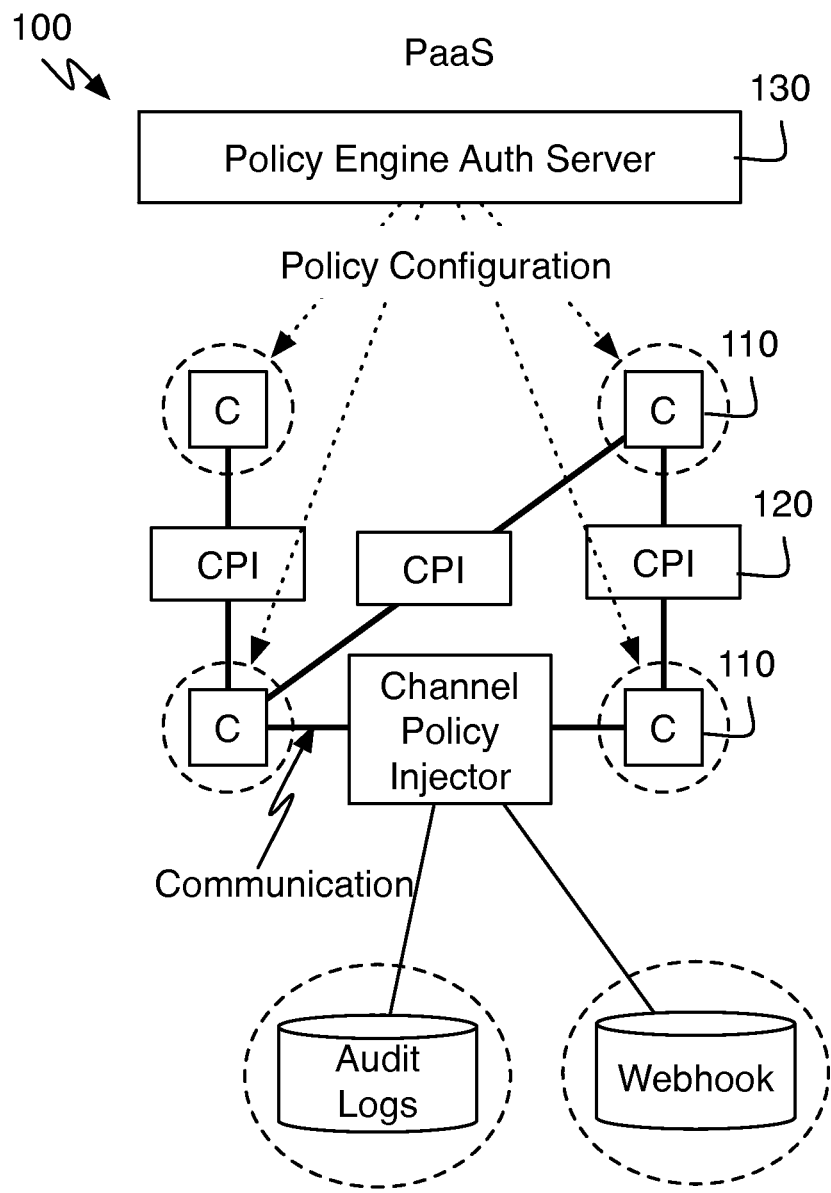
FIG. 3 is a schematic representation of a variation of a system of a preferred embodiment.

The outbound and/or inbound communications and interactions of a component are preferably passed through a channel policy injector 120. The channel policy injector is preferably an intermediary service, layer, or gateway for any communication channel between any two components. The policy injector 120 or instances of the policy injector are preferably distributed across each component 110 of the platform 100. Each component 110 preferably has an instance of a dedicated policy injector. A policy injector 120 preferably includes an input for validated token claims, requested resource, and requested operation. The policy injector 120 can additionally include policy updates or configuration, which is acquired a-priori to enforcement and is updated for any changes. The policy injector 120 includes a control output that determines if the sending/initiating components is allowed or permitted to perform an operation (s) on a resource or resources. The policy injector 120 can either actively prevent or allow the operation (e.g., returning error message or passing request to resource), but the policy injector 120 can alternatively just signal the decision. The channel policy injectors 120 are preferably pervasively integrated into each communication transaction between components, wherein each inter-component communication preferably has at least one channel policy injector acting on it. The channel policy injector can preferably augment communications, perform an authoritative check, and/or trigger events such as logging as shown in FIG. 3. More preferably, the channel policy injector is a semantic pipeline that includes a plurality of stages that can perform various tasks.

The auth server system 130 of the preferred embodiment functions to facilitate the creation, distribution, synchronization, and management of policies. The auth server system 130 is preferably a service or component in the system but more preferably a plurality of scalable instances of an auth server system 130. The auth server system functions to provide a central authority on policy (i.e., a policy engine). The auth server system may be used to process, verify, and enforce policy, but the auth server system 130 preferably delegates enforcement to policy injectors 120 that operate local or more local to the involved resources. The auth server system 130 may include an interface through which various entities may update and modify policies of the platform. The interface can be an application programming interface, an administrator user interface, a command line interface, a configuration file interface, or any suitable interface used in communicating policies. The auth server system 130 may additionally include a database or databases of policies. The policies may be defined for particular components or sets of components of the platform. A namespaced syntax can be employed in specifying and defining the resources referenced in a policy rule. Additionally or alternatively, rule policies can be defined for particular entities that interface with the platform (e.g., developers, security teams, IT departments, administrators, systems like Oracle Financials, etc.). Policies can target a specific component instance but may alternatively target a set or classification of components. For example, all Ruby on Rails apps could be referenced through the namespaced syntax in a policy. Policies are preferably distributed or published to appropriate components 110. Published policies are preferably cryptographically signed so that a component can be assured that the updated policy is valid and originates from the auth server system 130. The auth server system can additionally publish periodic signals to components to ensure that policy is currently up to date. For example, if the auth server system 130 crashes or has communications redirected, a component will not use out of data policy information if the heartbeat signal is not transmitted. The heartbeat signal is preferably a periodic signal generated and transmitted at regular intervals. The signal can be cryptographically signed so that the components no can verify authenticity.

Figure 4:
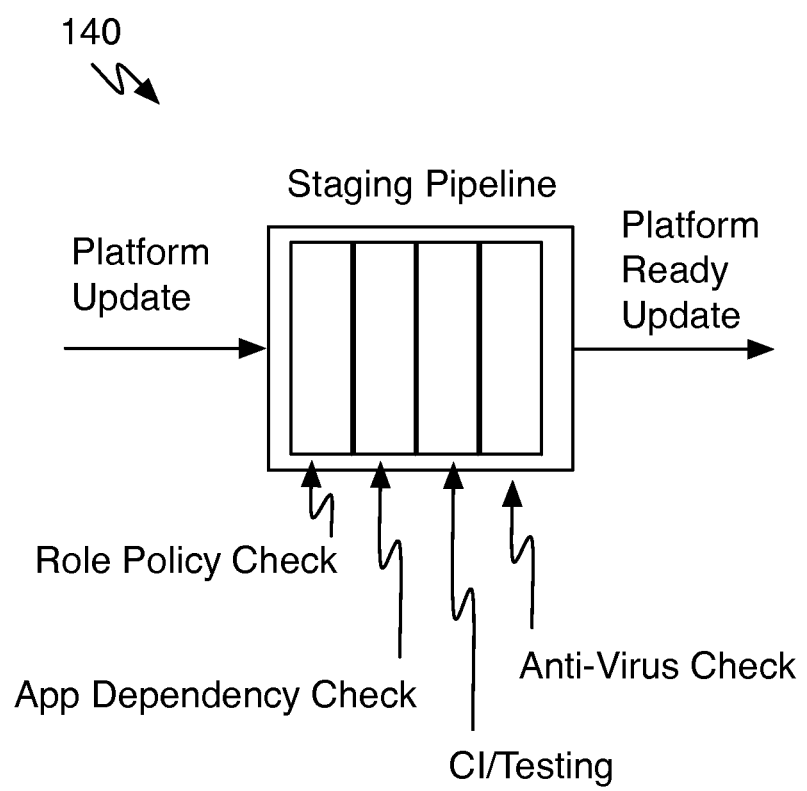
FIG. 4 is a schematic representation of a staging pipeline of a preferred embodiment.

As shown in FIG. 4, the staging pipeline 140 of the preferred embodiment functions to integrate platform updates into the platform. The staging pipeline 140 preferably receives platform updates and transforms the platform update to a platform ready update as shown in FIG. 2. The update is preferably executed in accordance with any staging related policy and such that policy is enforced once deployed. A platform update may be code, binaries, or other machine readable data configured for resource operation and execution on a computing device (e.g., an application, service, script, operating system, etc.). For example, a developer may push an application to the platform. A platform update may alternatively be an action, instruction, and configuration change within the platform. For example, a developer may submit a command to bind a database to an application. As a primary function, the staging pipeline 140 generates component configurations and adaptations that can be used to properly institute the platform update in the platform. Preferably policy can be defined for the staging pipeline 140 and associated components processed by the staging pipeline. The platform preferably allows components to be independently configured and to be given the flexibility to be developed for libraries and resources of a developer's choosing. However, the platform also enables policies to be enforced, and policies may be for the type and versions of resources used in the platform. The staging pipeline 140 can preferably identify package dependencies outside of a policy and create an adaptation that can be applied within a policy injector 120 or mores specifically within a semantic pipeline 150. Similarly, a stage may know which services are allowed within a system, and a stage may be used to bind an application to those services. The staging pipeline 140 preferably processes platform updates, and determines the proper adaptations that should be applied to the platform update to properly integrate the update in the platform. The staging pipeline 140 may additionally be configured for other services. A stage of the staging pipeline 140 may be a virus scanner that inspects the integrity of platform updates. Rule policy enforcement may additionally be enforced in the staging pipeline 140 by submitting the platform update or at least a parameter of the platform update (e.g., the action and the submitting entity) to the policy engine.

In an alternative embodiment, the system can additionally or alternatively include a semantic pipeline 150. The semantic pipeline 150 is preferably a variation that can be utilized in enforcing transparent policy injection. The semantic pipeline can be semantically aware of the resources being operated on, the operations performed, and the rules that must be applied to that resource in order for it to comply with policy. In one exemplary, use case the semantic pipeline 150 can be used to anonymize personally identifiable information from leaking out of a particular component (e.g., for enterprise HIPA compliance or PCI compliance). Since the semantic pipeline 150 is fully integrated into all inter component interactions of that particular component, there is a level of guarantee that the personally identifiable information is scrubbed, redacted, or otherwise anonymized for compliance reasons. The semantic pipeline 150 can similarly be applied in other use cases.

2. System for Transforming Inter-Component Communication

Figure 5:
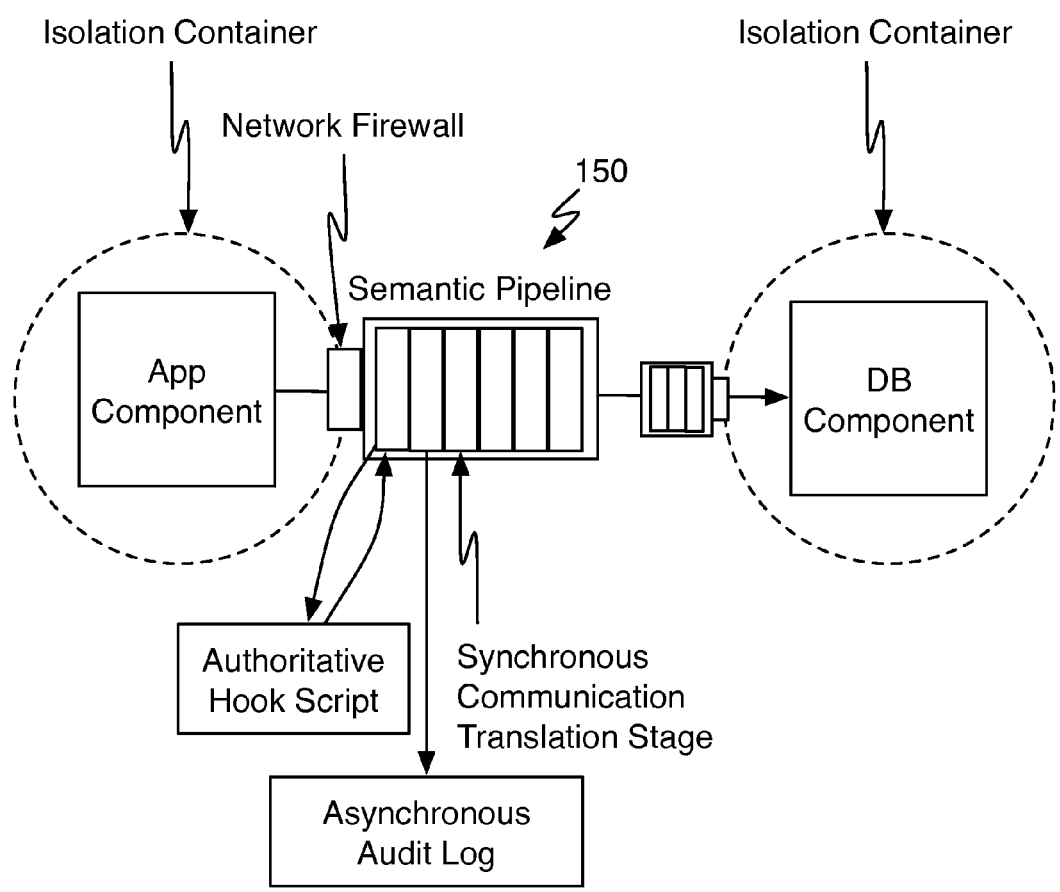
FIG. 5 is a schematic representation of a system for transforming inter-component communication.

As shown in FIG. 5, a system for transforming inter-component communication can include a semantic pipeline 150, which functions to semantically interpret transactions or operations involving components and apply defined policies on the transaction. The semantic pipeline 150 can be a particular implementation and application of the policy injector 120. Accordingly, the semantic pipeline can be used in combination with the system described above. Preferably, policy configuration is distributed and configured through the system above. The semantic pipeline 150 is preferably semantically aware of the occurrences within a communication channel, and in the broader view of the platform (e.g., using the combined knowledge of the semantic pipelines across the platform), the platform can have semantic awareness across the platform. The semantic awareness may be built for any suitable level of component interaction. For example, the semantic awareness within a semantic pipeline 150 may consider the type of component it is for (e.g., is the semantic pipeline for a database), but stages may be built with deeper awareness of interactions to look at particular properties of the possible interactions with that type of component (e.g., what database commands are communicated to the database). Preferably, each component (or isolation container) may be configured with one or more semantic pipeline 150. Alternatively, a group of components may be served by a single semantic pipeline 150. Similarly, a single component can be communicatively coupled to multiple semantic pipelines 150—different semantic pipelines 150 can be configured and bound to different ports or forms of communication. In a variation where there is no configured role for a semantic pipeline 150 of a component, the semantic pipeline 150 may be omitted. The semantic pipeline 150 is preferably configured for policy enforcement as one preferred form of policy injection. The policy of a semantic pipeline 150 may be defined and configured by an outside entity. Alternatively, the platform may create or alter a stage of a semantic pipeline 150 as a result of staging a platform update.

A semantic pipeline 150 can have a plurality of stages, wherein each stage may be defined by a different entity. A stage can perform any number of operations. In one variation, a semantic pipeline stage translates communications of a component to be interpreted by a policy-approved resource. In another variation, a semantic pipeline stage can be verification of user or application rule permissions. Preferably, the semantic pipeline stage is able to call out to a policy module that will determine if the requested communication is permitted. A rule policy may use the requesting component, the destination component, the parameters of the request, and/or any suitable property of the transaction to determine if the transaction is allowed or denied. Additionally, the rule policy may consume or access another service to further process the request. The output of the policy engine may additionally be other data pertinent to the process of the request. As an example, a rule policy may be defined that prohibits an application from issuing a DROP command to a database. A stage in the semantic pipeline 150 preferably valuates database commands according to rules provided by the policy engine (e.g., the auth server and policy injectors). The evaluator might, for instance, check if the database command is a DROP command. If the command is not a DROP command, the evaluator replies confirming that the command is allowed to be performed by the application and the semantic pipeline passes the command onto the next stage. If the command is a DROP command, then the evaluator causes the semantic pipeline 150 to not pass the command onwards and instead to either reject the command or drop the connection entirely, preferably as defined by the rules provided by the policy engine. Processing of a rule policy preferably processes more than just the direct requester, and can look at the full context of the request. The rule policy can preferably consider the usage of the current requester, who the current requester is calling on behalf of, and/or what the current requester is calling on behalf of. For example, all the parties in a server-to-server-to-server-to-server communication (or other suitable multi-party communication) may be checked when enforcing a rule policy. In another variation, a semantic pipeline stage can include the auditing of inter-component transactions. Auditing is preferably performed for any transaction outside of a component. As all interactions occur through the semantic pipeline 150, the platform can create full, automatic auditing capabilities.

Semantic pipelines 150 can be bound to outbound communications of a component and/or to inbound communication. For example, an application may have a semantic pipeline 150 bound to it when it talks to a database. Alternatively, the semantic pipeline 150 may be bound to the database. As another alternative, a semantic pipeline 150 may be bound to the application and a separate semantic pipeline 150 may be bound to the database. Semantic pipelines 150 may alternatively be bound to patterns. For example, a semantic pipeline 150 may be defined for all HTTP traffic or all database events.

3. Method for Transparently Injecting Policy

Transparently injecting policy within a computing infrastructure preferably involves integration of policy enforcement throughout the lifecycle of components of the system. In particular, policy injection is preferably applied during staging and/or active usage of components. Methods for operating components within the platform (method S100) and staging (method S200) function to enable policies to be applied to components of an infrastructure without impacting the individual component. The method can be used in architecting a composable and programmable infrastructure. Each component is preferably independent and can be developed and updated without updating other associated components. To IT managers and administrators regulating policy in IT solutions, this provides an infrastructure where policy can be integrated into the operation of any deployed solution. To developers deploying applications and services to the platform, this allows greater flexibility in development and ease of collaborating with other teams due to the policy layer that handles policy compliance. At the same time, enterprise issues such as compliance, audits, security, visibility, and control can be achieved through transparently applying policies during the integration and interactions of the components of the platform. The method is preferably used in enterprise focused (PaaS) infrastructures, but may alternatively be used within any suitable system. The system is preferably substantially similar to the system above. Transparent policy injection is preferably applied throughout the lifecycle of any component in the platform such as during staging and during operation. In preferred variations, the policy can include resource consumption policy (policy relating to memory, disk, transaction account, communication rate, and other consumption metrics), access policy (e.g., which application can access which services), and/or deployment/staging policy (e.g., which user/role can deploy an app or service to which environment such as production, development, etc; and what related deployments much be made in response to deployment, and the like).

Figure 6:
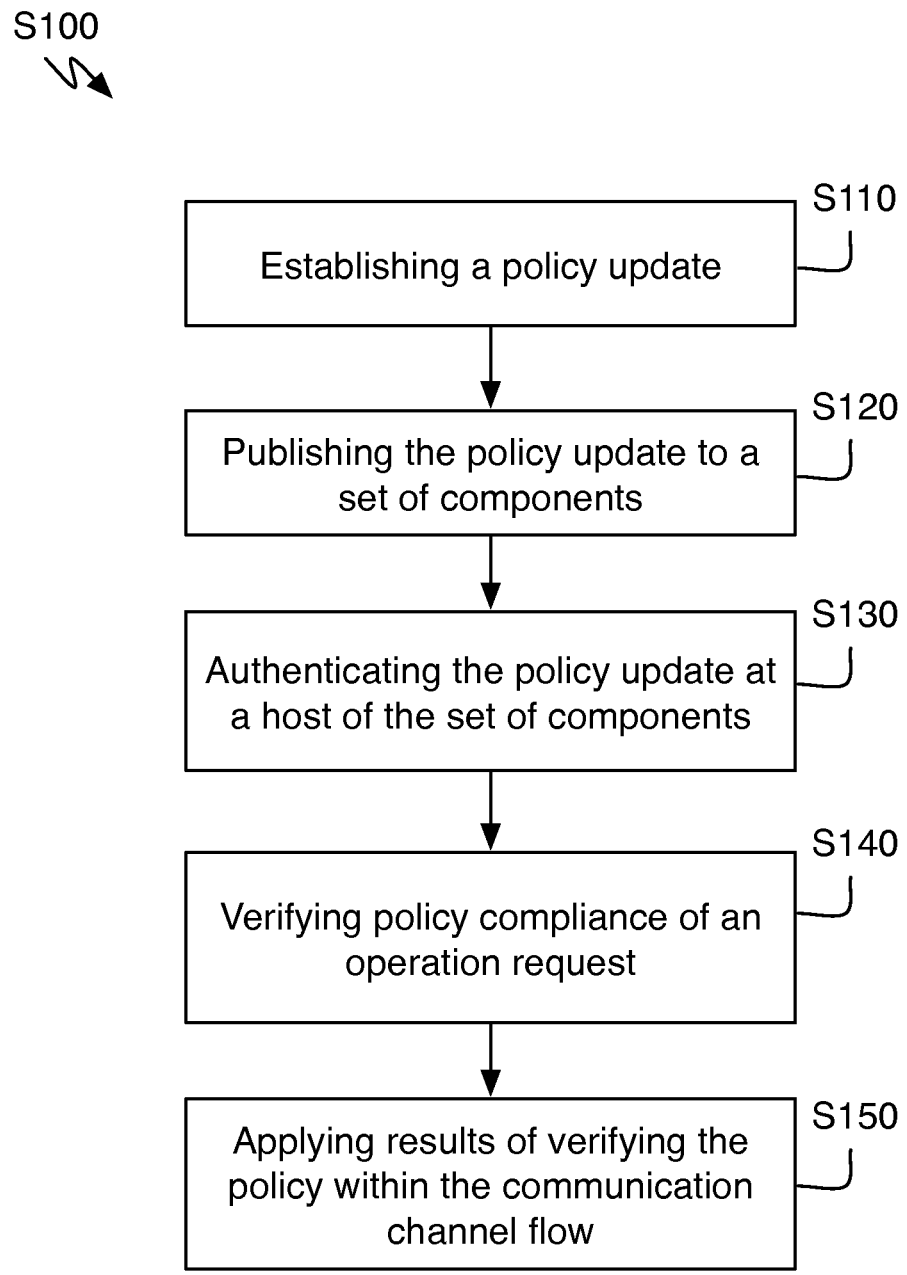
FIG. 6 is a flowchart representation of a method for transparently injecting policy.

As shown in FIG. 6, a method S100 for transparently injecting policy preferably includes establishing a policy update of a set of components of a platform S110; publishing the policy update to the set of components S120, authenticating the policy update at a host of the set of components S130, verifying policy compliance of an operation request by the host directed towards at least a second component S140, and applying results of verifying policy within the communication channel flow S150. The method functions to securely and reliably distribute policy to hosts within a cluster/distributed computing system. Reliability of policy enforcement can be promoted in one variation with a default of denying permission and granting access when received policy expressly permits the access. Policy enforcement is preferably predominantly enforced locally near a respective component. The secure publication and guaranteeing of updated policy configuration achieved in the method can allow policy to be reliably distributed to disparate hosts. Operating locally, policy can be applied to any inter component operation while avoiding latency issues, scaling issues, and/or security issues encountered with other centralized policy or staging-only policy approaches. The method preferably allows policy to be enforced between any two components and/or operation occurring on the platform. By integrating policy into the interaction model of the infrastructure robust policy can be achieved. Furthermore, policy is established as an infrastructure layer such that dependence and responsibilities of underlying components is reduced. For example, changes to a component cannot break policy compliance since the policy compliance is built into operation within the infrastructure. A component addressing or namespace approach can additionally be applied to flexibly target, specify, or reference components deployed on the platform. The method S100 is preferably used in combination with other variations of policy enforcement through lifecycle of components such as method S200 described below.

Block S110, which includes establishing a policy update of a set of components of a platform, functions to receive and configure policies within a platform. The policies are preferably set by an entity. Entities (e.g., a user account, administrator account, etc.) preferably have rules, privileges, permissions, or other defined capabilities that enable the entity to define at least one policy aspect. There can be multiple entities setting policies for different portion of a system. For example three different departments of an IT solutions team could include CIO governance, retail, and customer support all of which could define varying policies across production, development, and sandbox environments on the platform. Policies may additionally or alternatively be imported from an existing policy store in the enterprise. A plurality of entities preferably collectively defines policies for various aspects of the platform. Policies may be defined for supported libraries, protocols, frameworks, or other suitable components of the platform. More preferably, the policies may define particular versions of the components that should be used. Similarly, policies may be defined for allowed or blocked actions. In one variation, action policies may be defined specifically for different targeted or specified components. For example, a policy may be defined that prohibits DROP and INSERT commands from being performed on a database on behalf of an application. The policies may be defined and communicated through a configuration file, retrieved through a control panel graphical user interface, retrieved over an application programming interface (API), a command line interface (CLI) or received in any suitable manner. The policy is preferably initially established at a central auth server system. The auth server system can host or manage a canonical form of the policy. The set of components can be a set of multiple components (e.g., component instances that are identified through a parent namespace node, a class or type of component, and the like), a single component (e.g., a single specified component instance), and/or an empty set. When components are processed through the staging pipeline, existing policies can be appropriately assigned to any new components.

As opposed to enforcing such policies in the implementation of platform components (e.g., where developer have to actively design packages in a compliant manner), the policies are preferably transparently injected in the inter-component operations of the platform. The policy enforcement is preferably injected a layer above component application logic such that policy compliance is abstracted above the layer of component design. In other words, the policies may be applied without an application being aware of or making accommodations for the policies (i.e., other than configuration, application code is preferably not changed). The policies can be integrated into staging pipelines and/or channel policy injectors.

Establishing a policy update of a set of components of a platform can additionally include establishing a policy update of a set of components through a namespaced policy addressing syntax. The namespaced policy addressing syntax functions to extend granular control over a large portion of the infrastructure and also provide feedback from a set of components. Preferably, all or substantially all resources in the platform are identifiable. At least resources visible by end users can preferably have defined policy. In an exemplary implementation, the namespace is used in identifying various types of resources that can include an auth resource, packages, services, jobs, stagers, policy, principal entities, staging pipeline, and/or internal platform resources. The namespace policy addressing syntax is preferably applied in the configuration files that define policies. Namespaced referencing preferably groups components by their functionality, but can alternatively use any suitable grouping or topology organization. A namespace is preferably a container for a set of identifiers and can allow for the disambiguation of homonym identifiers residing in different namespaces. Individual instances of a particular component can be addressed through the namespace syntax, and additionally, a hierarchical grouping of components can be referenced. In one implementation, the namespace syntax uses hierarchical namespaces, where namespace identifiers: indicate critical functional areas; share traversal semantics and use a common separator (e.g., a slash '/'); use identifiers that can scale over time; and enable policy to be attached to various nodes in the namespace. Furthermore, a parent node policy can be inherited by child nodes, but child node policy is not inherited by parent nodes. Parent nodes can additionally specify if children nodes can expand, override, or modify parent policies. Any suitable implementation of a namespace syntax can alternatively be used.

Block S120, which includes publishing the policy update to the set of components S120, functions to distribute policies to specified components. Publishing the policy updates preferably involves transmitting policy configuration from an auth server to a component relevant to the policy. For each policy set within the system updates are preferably distributed to the appropriate component. Furthermore, guarantees are preferably established through the approach of policy distribution as to the authenticity of the policy (e.g., is this an authentic policy) and status of the policy (e.g., is this policy the most current version at time of evaluating policy compliance). The publishing of the policy update may use a publication and subscription type approach where components subscribe to a set of policy updates. For example, one component may subscribe to policy updates for each higher-level namespace categorization as well as an instance identifier. Policy can additionally include version numbers. Preferably the policy uses a strictly increasing version identifier as a check to prevent reverting to older version numbers.

Figure 7:
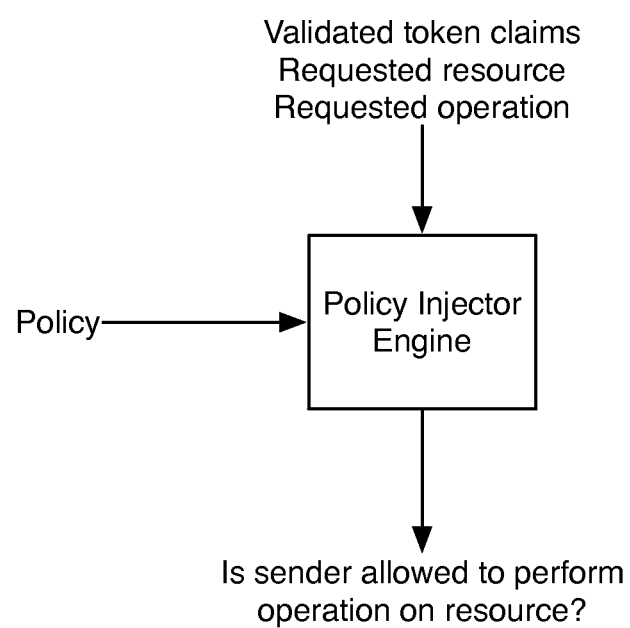
FIG. 7 is a schematic representation of use of token claims in validating policy decisions.

The publications can be cryptographically authenticated as originating from the auth server and thus can be considered legitimate policy updates as shown in FIG. 7. The auth server can use auth tokens to validate authenticity of its policy updates to components such as using Oauth2 type protocol or other suitable authentication protocols. Publishing of the policy update can additionally leverage elliptical curve cryptography (ECC) through OpenSSL. Public keys can additionally be included in the tokens, which can provide additional assurance of sender identity. The method preferably employs validated tokens to pass context between a sender and a receiver. Such secure inter-component validation can be used in distribution of policy to a component as well as in making an operation request between two components.

Figure 8:
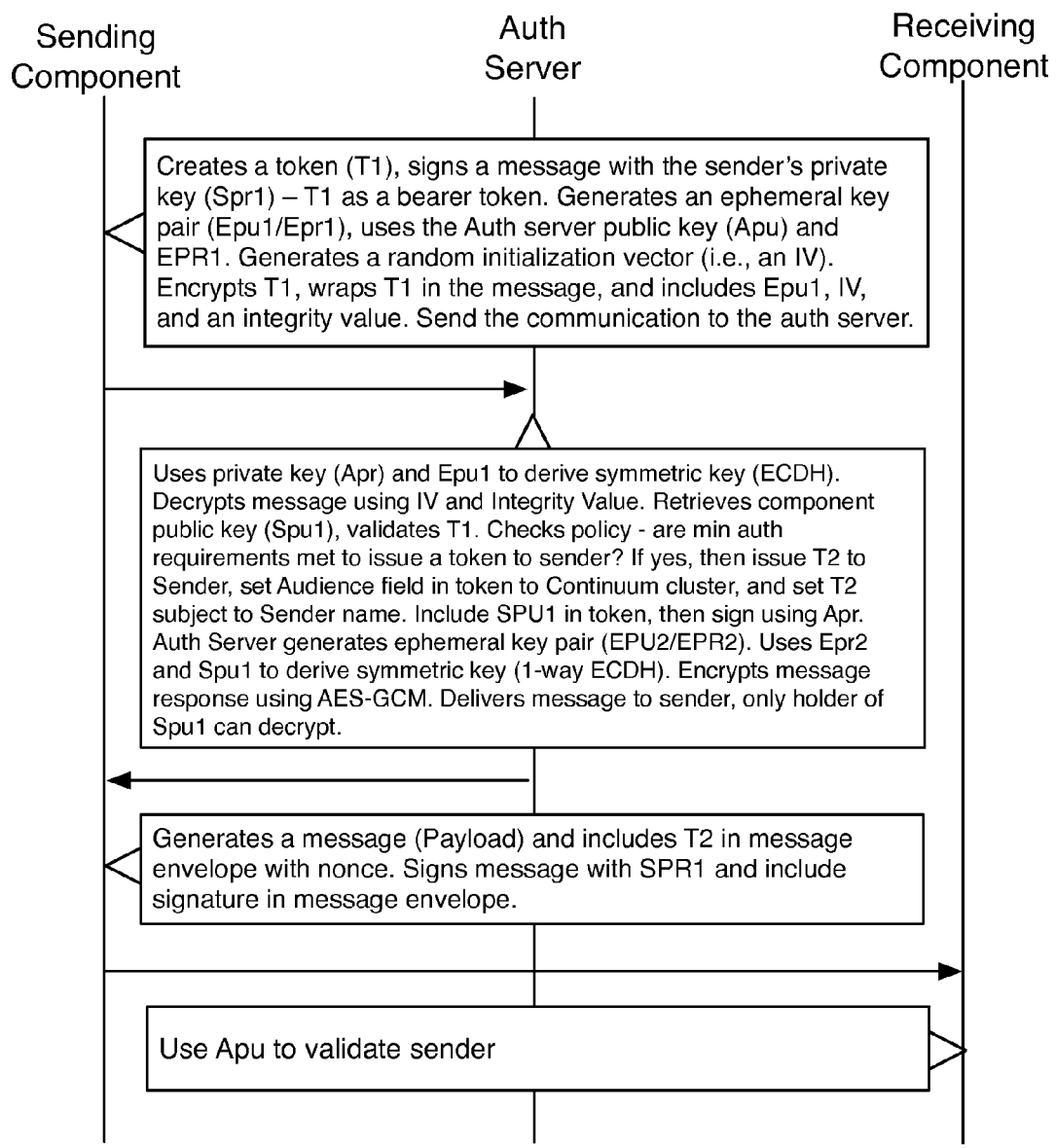
FIG. 8 is a communication flowchart of secure inter-component validation through cryptographically signed tokens.

As shown in FIG. 8, an a preferred implementation of secure inter-component validation, a component sender creates a token (T1), signs a message with the sender's private key ($S_{pr1}$)–$T_1$ as a bearer token. The sender then generates an ephemeral key pair ($E_{PU1}/E_{PR1}$), and uses the auth server public key ($A_{PU}$) and $E_{PR1}$ to derive a symmetric key for one way elliptical curve diffie Hellman (ECDH). The sender generates a random initialization vector (i.e., an IV) The sender then encrypts $T_1$ (e.g., using Advanced Encryption Standard-Galois/Counter Mode (AES-GCM)), wraps $T_1$ in the message, and includes $E_{PU1}$, IV, and an integrity value before sending the communication to the auth server.

In this preferred implementation of secure inter-component validation, at an auth server the communication is received and the request can be validated. The auth server can use its private key ($A_{pr}$) and $E_{PU1}$ to devise a symmetric key (ECDH). Then the Auth server decrypts the received message using IV and the integrity value. The component public key $S_{PU1}$ is retrieved and $T_1$ can be validated. The auth server preferably checks the policy to ensure that the minimum auth requirements are met to issue a token to the sending component. If minimum auth requirements are met then the auth server issues $T_2$ to the sender, sets an audience field in the token to the infrastructure cluster, and sets $T_2$ subject to the sender name. $S_{PU1}$ is included in the token, and then the auth server signs using $A_{PR}$. The auth server generates ephemeral key pair ($E_{PU2}/E_{PR2}$), and uses $E_{PR2}$ and $S_{PU1}$ to derive a symmetric key (one-way ECDH). The auth server then encrypts the message response using AES-GCM, and delivers the message to the sender. At this stage only the holder of $S_{PU1}$ can decrypt the message.

Continuing in the preferred implementation of secure inter-component validation, at the component, a message is generated (i.e., the payload) and includes $T_2$ in the message envelope. A nonce can be included. The component signs the message with $S_{PR1}$ and includes the signature in the message envelope. As a result the receiver has proof that the sender is accurately described in $T_2$, and requires no I/O for token validation assuming the receiver has the $A_{PU}$. The resulting token is preferably an encrypted message such as the one shown in FIG. 9A. The message can include various information such as type, algorithm information, issuer of the token, the audience, token timestamps, token expiration time or conditions, a user identifier, a proof key, and claims as shown in FIG. 9B. A receiver of a token can know which and/or what component sent the communication, how the message was authenticated, as well as other optional information such as who the component is acting on behalf of. In effect two endpoints can establish confidential channels over NATS The validated token approach can be used in delivery of policy to components including inherited policy as needed. Additionally, the token can be used in validating operational communications between components such as in blocks S140 and S150.

Block S130, which includes authenticating the policy update at a host of the set of components, functions to verify that the published policy update is valid and originates from the auth server. Authenticating the policy update preferably prevents man in the middle attacks from modifying policies or replaying policy updates. Additionally, policy updates will include a policy version identifier. The version identifier is preferably strictly increasing (i.e., always increases for each new version number). The policy version identifier can be checked against the previous version identifier if it exists. The policy update is accepted if the token validates that the policy update originates from the auth server and the policy version identifier is an updated version compared to the previous version. If the version identifier does not increase the policy update is denied and no change to the policy is instantiated. Similarly, the token is not authenticated then the policy update is denied and no change to the policy is instantiated. As mentioned above, the policy update is preferably delivered to appropriate components. For example, a policy update can be published and authenticated at all components that are a ruby on rails applications. In another example, a policy update can target particular instances such as a particular instance of a ruby on rails application. Once a policy update is authenticated, the policy information is instantiated for local enforcement. The policy rules can be stored for enforcement during block S140.

Block S140, which includes verifying policy compliance of an operation request by the host directed to at least a second component, functions to enforce policy locally at a component. A component, during execution, may at times require transmitting an operation request to a second component. An operational request is preferably any communication originating from a sender to at least one receiving component. The operational request can be an information request, an information response, pushed information, data editing directive, and/or any suitable operational transmission. For example, a web application may need to access a database and will therefore need to consuming an outside database service. A policy can determine what applications (i.e., component one) can consume what services (i.e., component two). For an access policy, the policy can be based on who is involved in the communication, what is being communicated, and how the communication is occurring. For resource consumption policy, the policy decision can be based on resource consumption of one or more components. Policy rules can additionally be used in combination with a semantic pipeline in modification or regulation of operational requests. Additionally while enforcing policy, logging of operational requests can occur. In a preferred embodiment the full inter-component operational request history is recorded so that the system is auditable.

Additionally, the method can include at a component updating policy in coordination with periodic heartbeat signal of an auth server S142. Block S142 can function to use a periodic signal from the auth server to check if the local policy is current. Providing a heartbeat signal preferably includes the auth server periodically sending out a message to components regardless of policy update. This can guarantee that the policy instantiated locally at a component is up to date with a time resolution of the time period between transmissions of the heartbeat signal. The heartbeat signal can use a similar token authentication process as used in transmitting the policy update. Additionally, the heartbeat can use a strictly increasing version identifier to prevent replay of a heartbeat signal "pulse". In one variation, the version identifier continues the policy version identifier and vice versa. The component will preferably receive a heartbeat signal transmission, authenticate that the heartbeat signal originates from the auth server (or any approved component) and verify the heartbeat signal is valid (e.g., the identifier is valid based on previous heartbeat signals). Timing checks can be in place such that if a heartbeat transmission is not received within a predetermined time frame then the component can initiate a communication with the auth server to verify status of the policy. During this time period, policy could be set to fully restrict actions of the component since the policy may be out of date, but any suitable policy regulation can be used. The time period can be set to any suitable resolution such as one second, but the time period may be shorter or longer. The heartbeat time period can additionally be set depending on the use of the infrastructure, or in another variation, policy can define the heartbeat time period sensitivity.

Figure 10:
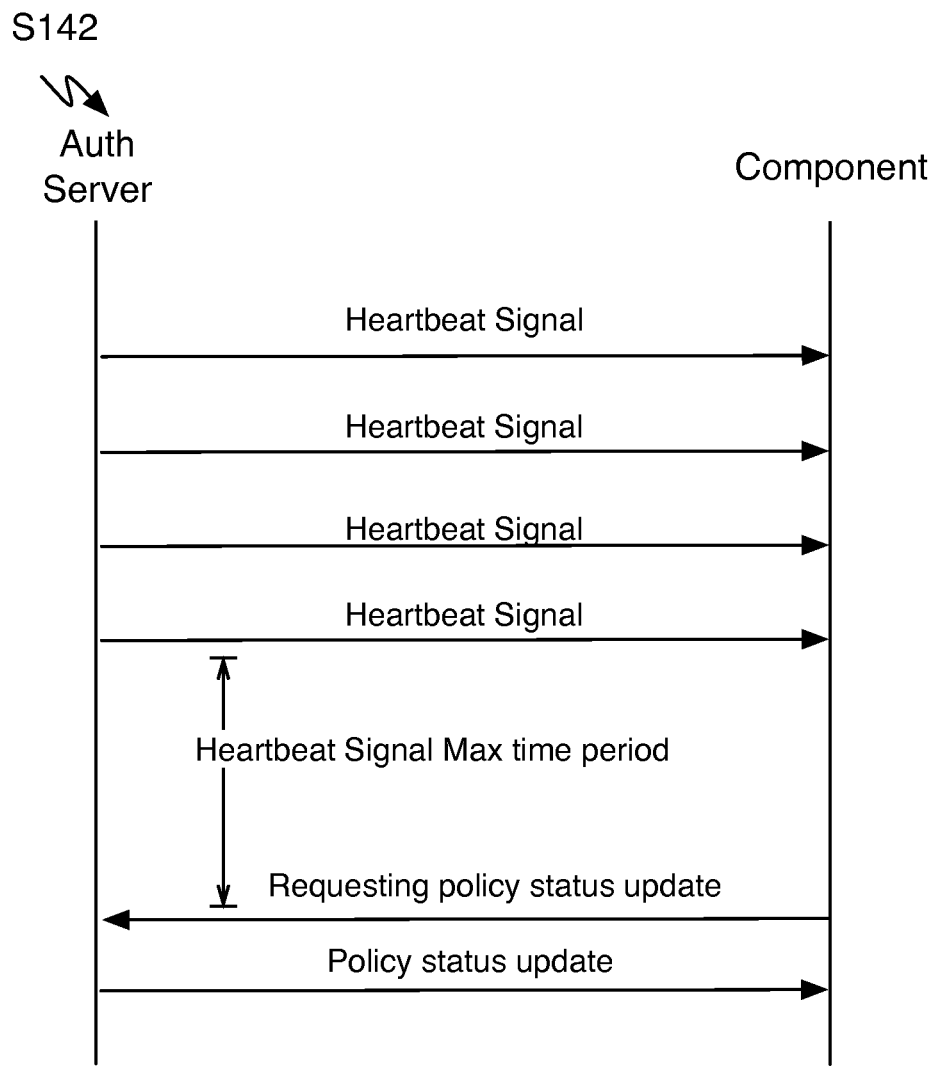
FIG. 10 is a communication flowchart of use of a heartbeat signal in maintaining the policy current.
Figure 11:
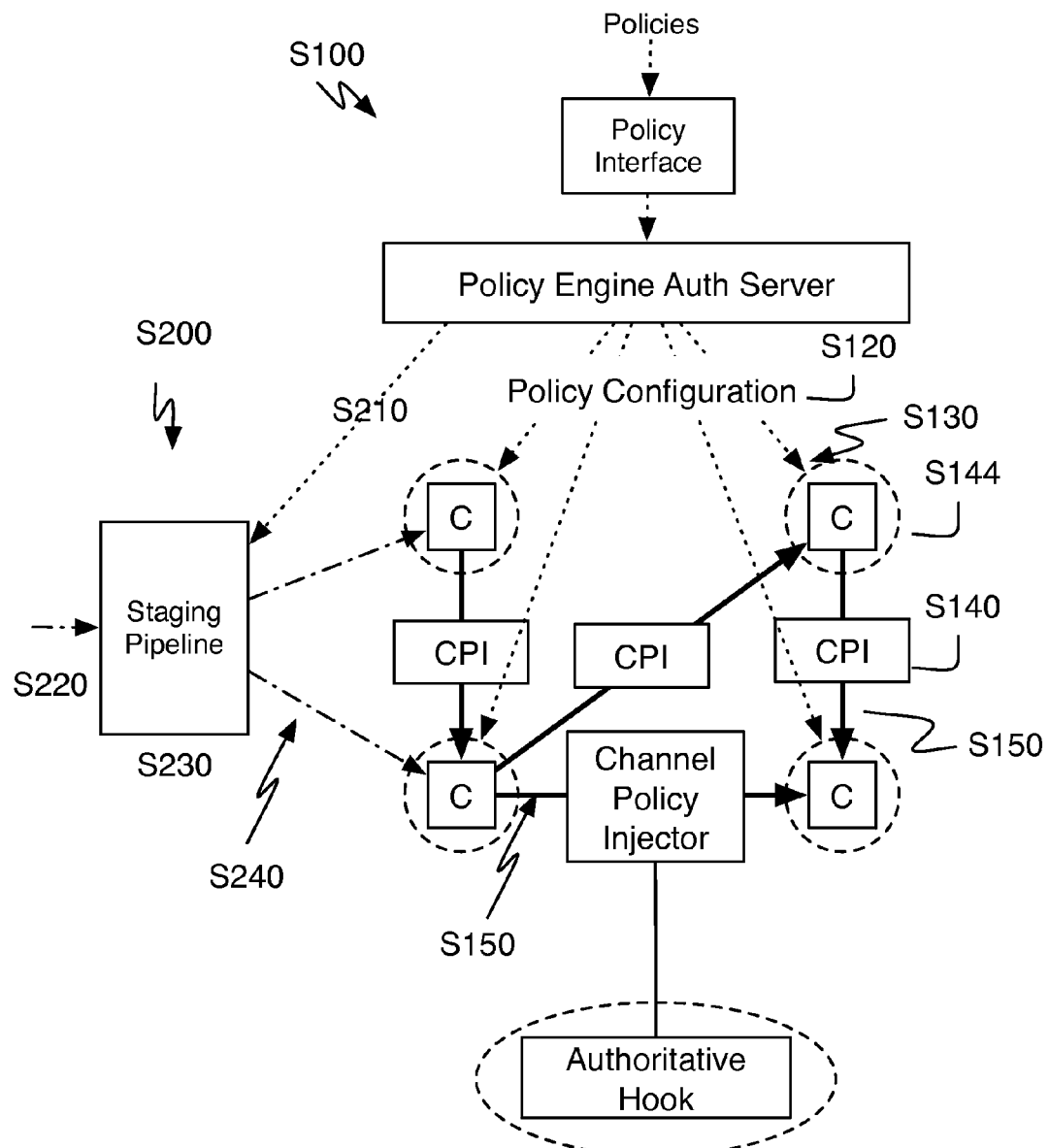
FIG. 11 is a schematic representation of a method with the variation of isolating components of the platform.

Verifying policy compliance preferably includes checking current status of the policy rules at the component. The current status is preferably determined from the heartbeat signal. If the policy rules are out of date, the policy can be checked through the auth server as shown in FIG. 10. In one variation, the policy is enforced at the auth server. In a second variation, the component will perform a policy update with the auth server prior to locally enforcing the policy. If the heartbeat signal is current, then the policy can be treat as current and enforced without updating.

In one implementation the method includes isolating components of a platform S144 functions to provide component independence from outside components. While components may be implemented with the assumption of dependent components (e.g., configured databases and included libraries), the component is preferably isolated so that all dependencies can be controlled and adapted to platform policies within a channel policy injector. Preferably, each component or at least a substantial portion of components is implemented within an isolation container. The isolation container is preferably an operating system-level virtualization implementation (e.g., a Linux container). The isolation container may alternatively be any suitable mechanism for isolating or containing a component. Any suitable component may be placed in an isolation container such as an application, a database, an operating system, a server, a service, or any suitable component. Isolating the components preferably enables any suitable implementation to be used. As components are isolated and other dependent components are accessed through a transparent channel (e.g., the channel policy injector), a wide variety of development tools can be used while still conforming to policies of a platform. This can provide flexibility to developers, IT departments, and platform administrators that may have various preferences for different programming languages and frameworks. Isolating the components can also enable enterprise level platforms to adapt to the quickly evolving landscape of development tools.

Block S150, which includes applying results of verifying policy within the communication channel flow, functions to respond to policy processing. If an operational request is not permitted, an error is returned to the component or otherwise the operational request is prevented, halted, or modified. If the operational request is permitted the communication is transmitted to the proper component. A default setting can be used if no policy is defined for the action—one preferred implementation defaults to denying communication channel flow unless policy defines the rules of that communication channel flow.

Additionally, routing communication channels through a channel policy injector can include logging and sending notification communications, which functions to use the transparent nature of policy injection for the full auditing of the platform. As substantially all the components of the platform are preferably architected in a similar manner (as components in isolated containers interconnected with channel policy injectors), audit logs can track all transactions within a system. Logging is preferably stored for all transactions between any two components. An audit log will preferably include the parameters of the request, time of request, and involved components. In an alternative embodiment, audit logging may be enabled through a similar implementation without injecting policy. Audit logging can be used in satisfying compliance requirements, and/or conforming to capabilities demanded of enterprise platforms.

Blocks S140 and S150 preferably which include routing communication channels through a channel policy injector, which functions to process inter-component communications. The channel policy injector preferably is established locally at either the isolation container of the sending component or at the isolation container for the receiving component. A channel policy injector can similarly be used at the sender and the receiver. A channel policy injector may be bound to any component and, preferably, at least one channel policy injector is bound to a component of the platform. The channel policy injector preferably enforces policies, processes communication, and triggers events within the platform. Various entities may be enabled to manage, control, and update the channel policy injector. Since the channel policy injector enforces policy independently of component operation, the channel policy injector can be easily updated to enforce new policies. As described above, in one variation, the channel policy injector translates communications of at least two components so that a component can use a policy defined for dependent resource. For example, an application may be developed to use a first version of a library, but a policy defines a second version of the library as the supported library. The application's use of the library may be translated to use the second version of the library. In another variation, the channel policy injector may be set to enforce an authoritative check on communications and jobs from the component. In another variation, the channel policy injector can trigger other tasks and processes such as updating an audit log. In one variation, the channel policy injector is a semantic pipeline composed of a plurality of stages. The stages of the semantic pipeline may have synchronous (i.e., inline) stages and/or asynchronous stages.

Additionally, the method of a preferred embodiment may include transitioning policies, which functions to substantially seamlessly enable new policies within the platform. As mentioned before, the transparent enforcement of policy preferably alleviates components from internally implementing policies. And the enforcing of policies within the channel policy injector can be used so that policies can be updated within the channel policy injector rather than in the implementation of the components. Preferably, the auth server receives new policy directives or changes. The auth server then publishes the new policy updates to appropriate components in a manner substantially similar to block S120. The new or updated policy change is applied to the associated channel policy injector, and the policy is established locally at the component. In one variation, the communications and operational requests may be progressively transitioned to a channel policy injector with the new policy in such a way as to reduce the risk that the policy changes will have an adverse impact on the component, connected components, and/or platform. Once all communications of the communication channel are being routed through the new/updated channel policy injector, the old channel policy injector may be deallocated or repurposed. As an exemplary use case, an exploit in a library may be discovered and require immediate action. A policy may be issued that addresses the exploit (e.g., using a patched version of the library). The new policy changes the channel policy injector so that components that used the exploited library are now directed to the new library. The application can begin conforming to the new policy without having to make changes to accommodate for the exploit. Additionally, the application can avoid suffering from downtime while implementing policy changes.

Figure 12:
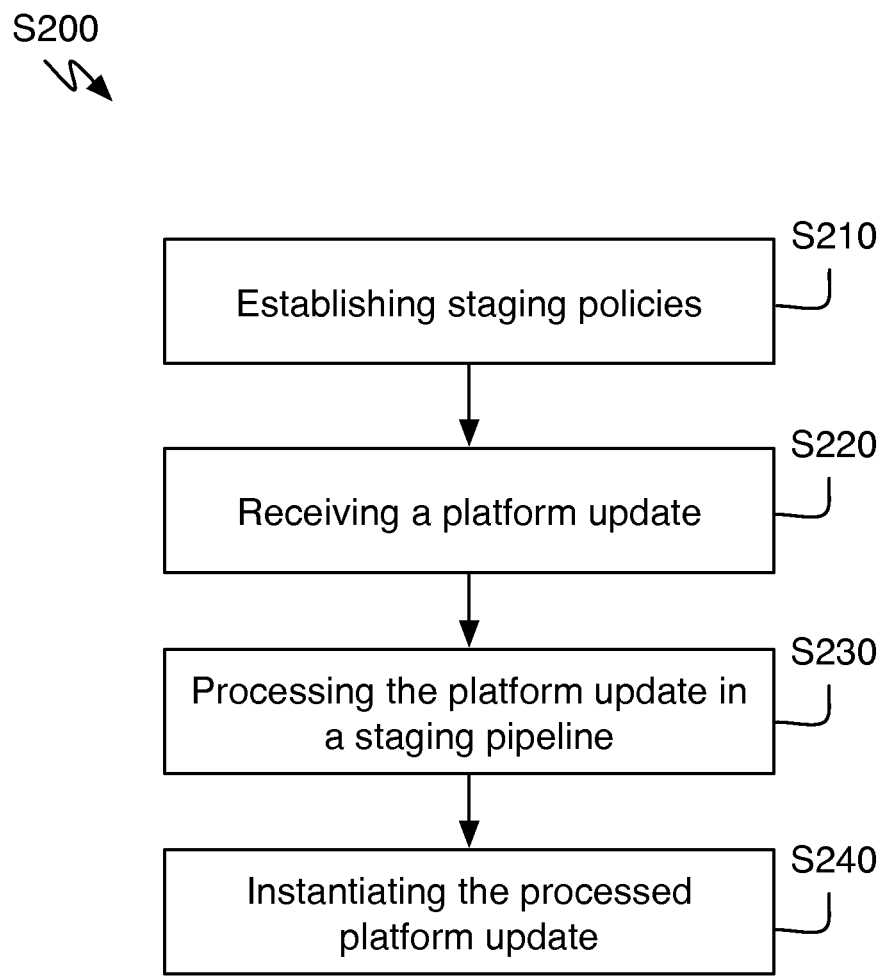
FIG. 12 is a flowchart representation of transparently injecting policy during staging.

As shown in FIG. 12, a method S200 for transparently injecting policy during staging preferably includes establishing staging policies S210; receiving a platform update S220; processing the platform update in a staging pipeline S230; and instantiating the processed platform update in the computing infrastructure S240. The method S200 functions to enforce policy during the enrollment and deployment of a new or modified component in the platform. The method S200 is preferably used in combination with the method S100 such that policy can be established and distributed to appropriate stager components. In enforcing the policy during deployment, components are compliant with policies upon coming onboard at the platform. Once onboard method S100 can continue subsequent lifecycle policy adherence during operations between resources.

Block S210, which includes establishing staging policies, functions to receive and configure staging policies within a platform. The policies are preferably received and distributed in substantially a similar manner to blocks S110 and S120. Multiple entities can set policies for different components as the components are staged, pushed, enrolled, or established in the platform. The policies can be set through various interfaces such as command line interfaces, configuration file interfaces, user interfaces, an application programming interface, and other suitable interfaces. The policies can be distributed from the auth server or any suitable component. Signatures can be used in authenticating the origin of the policy updates that were delivered to the staging components. A heartbeat signal can additionally be used in verifying that the policy used while staging is up to date. Additionally, As a component is staged, policies for the operational requests of the component can be established at that component, but policies can additionally provide various rules over what components are introduced, how they are introduced, how other components may be modified or introduced in response to the component, and/or other suitable staging operations.

The policies are preferably applied through a namespaced policy addressing syntax as in block S112. Preferably any component added or modified through a staging process can use the namespaced syntax to refer to the components. Platform updates can have the namespaced syntax map to staging requests so that policy can be appropriately applied.

Block S220, which includes receiving a platform update, functions to initiate the integration of a new update in the platform. In one variation, the platform update may be a creation or augmentation of a component in the platform. The platform may be a new application or an update to an existing application. For example, an application developer may push an application to the platform. The push update is preferably received as a form of a platform update. In another variation, the platform update may be an action request. Action requests may include commands to configure a component, to bind components, or to make any suitable change to the platform. For example, a developer, upon pushing an application, may submit a request to bind the application to a database. The request of a command line interface or alternatively the bind package may be received as the platform update. Receiving a platform update may additionally enable a continuous integration scenario, wherein a system automates the users process of tasks such as deploying in a test environment.

Figure 13:
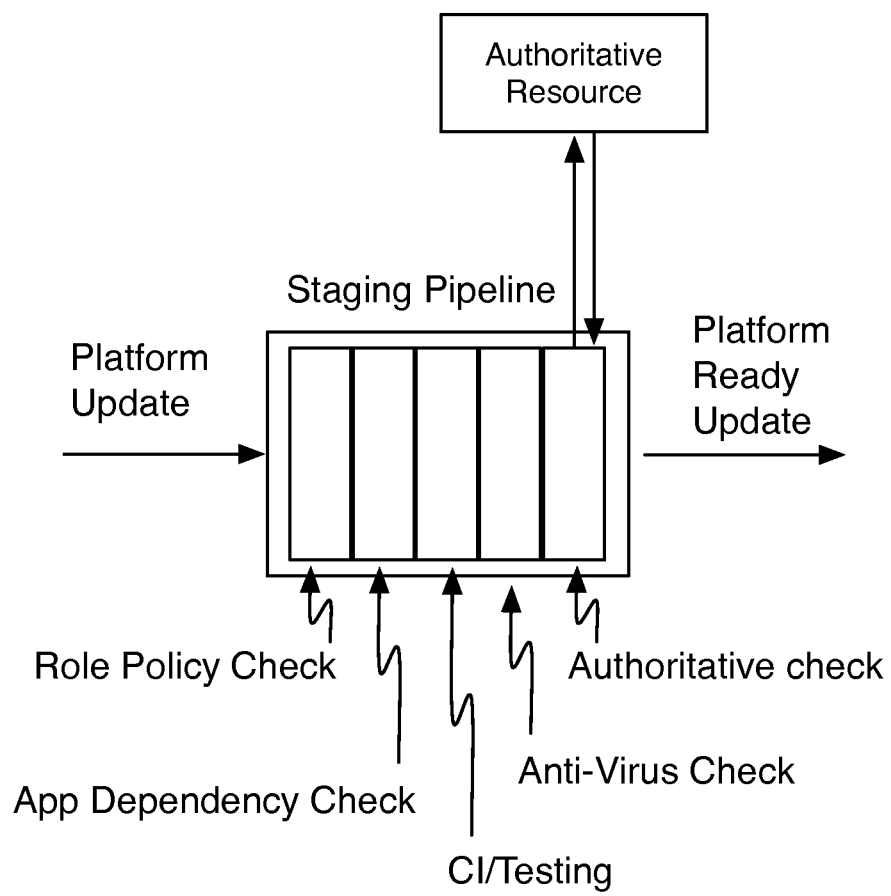
FIG. 13 is a detailed schematic representation processing a platform update through stages of a staging pipeline.

Block S230, which includes processing the platform update in a staging pipeline, functions to analyze a platform update package and determine how to integrate the platform update so that the update conforms to defined policies. Processing the platform update preferably includes enforcing staging policy on requested components to be staged and/or the components relating to the requested components. The platform update is preferably composed into a package that is then processed in a staging pipeline. The staging pipeline can include a plurality of stages that determine transformations to make the platform update conforming to and/or enforce policies on the platform update. The package is preferably progressively transferred through the stages, and the resulting processed platform update is a package that can be integrated into the platform and is compliant with the established policies. The stages may be defined by any suitable entities, and the stages may have any suitable role in the processing of the package. Processing the package in the staging pipeline or in at least one stage of the staging pipeline may include analyzing content of the package. A staging policy may define a rule for particular versions of applications or services. For example a particular version of ruby, Java, Ubuntu servers, and other software versions may be limited. If the version requirements of a policy are not satisfied the component is restricted from being staged in the platform. In one variation this may include determining component dependencies. The type and version of various packages may be determined, and if the dependencies do not conform to defined policies, configuration changes may be made in the channel policy injector. At least a second component can be updated or a new component may be staged to satisfy the resource requirements of a policy. The configuration changes of the channel policy injector in one variation can adapt the communications to use a policy-defined resource. Stages of the staging pipeline may additionally or alternatively perform authoritative checks on the platform update. Some entities may have defined rules and/or limitations. An authoritative stage may, for example, permit or prohibit the platform update based on the type of platform update and the identity. Logs of authoritative checks can additionally be stored and audited to review the authorization of components that require approval. In one variation, major releases to a production environment may require administrator approval as shown in FIG. 13. The approval may be obtained through an administrator web portal or any suitable interface. If approval is not obtained, the staging can be canceled or any suitable response taken. An error message, alert, or other suitable signal may be transmitted as a response to the platform update if the platform update cannot be completed. Other stages of the staging platform may include testing, scanning for viruses, and/or any suitable additional operation. The platform update is preferably inspected according to various test routines (e.g., virus tests, performance tests, and the like) in a testing policy stage. A staging policy rule can define one or more tests that should be performed during the testing policy stage. The packages are preferably specified using the namespaced addressing syntax. One exemplary test stage may run an AppScan test on an application, which can check on length of time and jobs when running alongside the staging system. A virus test stage can check the package for malicious code patterns and other vulnerabilities.

Block S240, which includes instantiating the processed platform update, functions to configure the platform to implement the software update. The platform update is preferably instantiated in at least one component of the platform. The component as described above is preferably operated within an isolated container and has policy locally established for local enforcement during operational requests. In one variation, this may include creating a new component in the platform as defined by the platform update. For example, this may be instantiating an application, database, server, or any suitable job or service of a defined component that is pushed to the platform. Additionally, instantiating the processed platform update may include setting configuration files according to the processing of the staging pipeline. Similarly, instantiating the processed platform update may include configuring a channel policy injector of the associated component and/or other components. Configuring the channel policy injector preferably functions to enforce policies and processing configurations. In one variation, the channel policy injector translates communications of at least two components so that a component can use a policy defined dependent resource. In another variation, the channel policy injector may be set to enforce an authoritative check on communications and jobs from the component. In another variation, the channel policy injector can trigger other tasks and processes such as updating an audit log. In one variation, the channel policy injector is a semantic pipeline composed of a plurality of stages. Configuring the channel policy injector may additionally include creating, editing, removing a stage in the semantic pipeline.

4. Method for Transforming Inter-Component Communications

Figure 14:
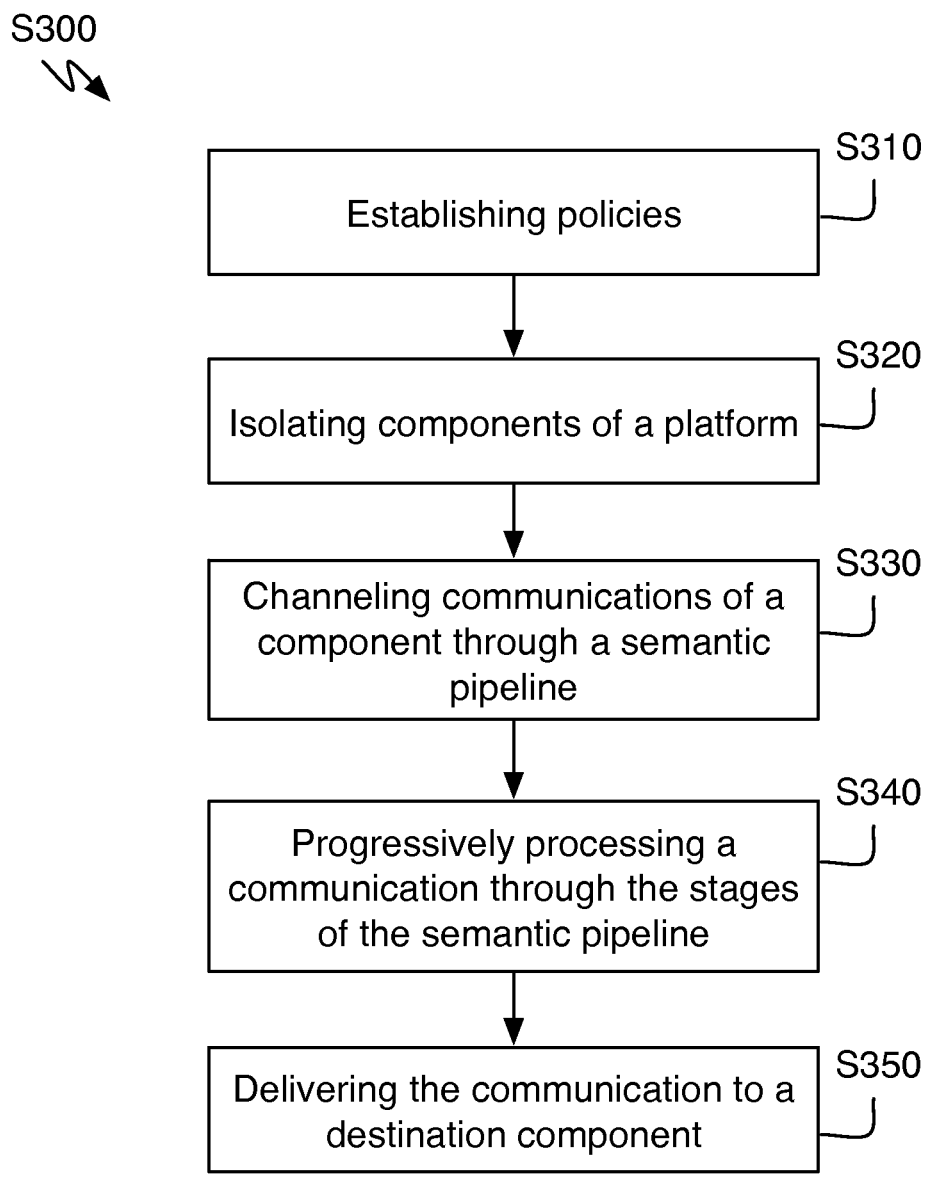
FIG. 14 is a flowchart representation of transforming inter-component communications through semantic interpretation of a preferred embodiment.
Figure 15:
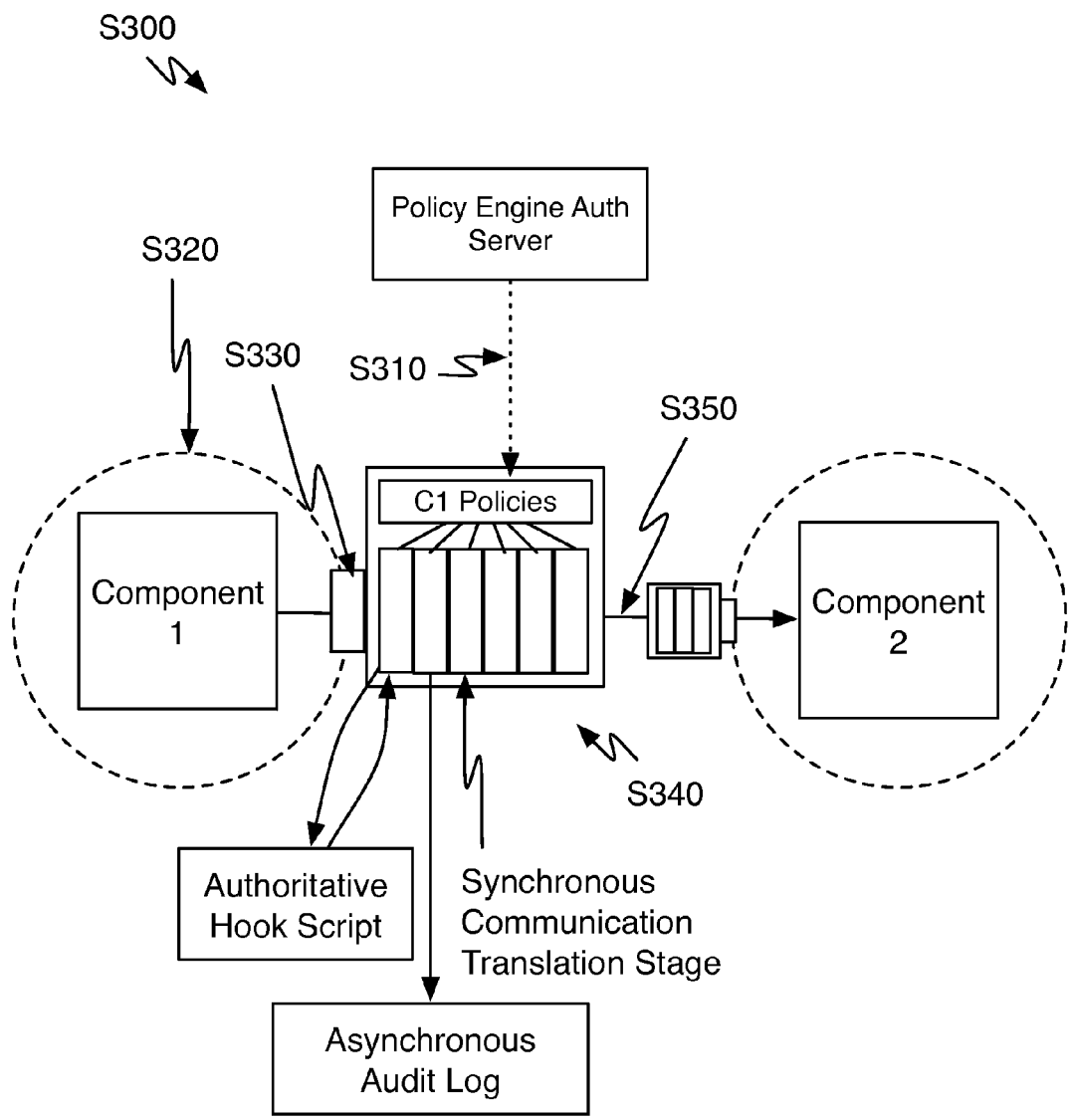
FIG. 15 is a detailed schematic representation of a method of transforming inter-component communication.

As shown in FIG. 14, a method S300 for transforming inter-component communications through semantic interpretation of a preferred embodiment can include establishing platform policies S310; isolating components of a platform S320; channeling communications of a component through a semantic pipeline S330; progressively processing a communication through the stages of the semantic pipeline S340; and delivering the communication to the destination component S350. The method functions to abstract an eventing framework above the internal operation of individual components so that policy and operations can be changed and augmented during inter-component interactions. Enterprise solutions can use the method so that the various stakeholders can enforce system-wide policies throughout a network system without requiring each component to individually integrate the policies in the operation of the component. The method is preferably used in enterprise focused (PaaS) infrastructures, but may alternatively be used within any suitable system. Semantic pipelines are preferably integrated throughout the platform for substantially all inter-component communications or jobs. Thus, the method can further function to build a semantic understanding of interactions within the platform. In one variation, the method is applied to provide the policy injection of the methods S100 and S200 above. As a benefit of the method, the rules, hooks, policies and/or other aspects that impact a semantic pipeline can be changed during the life of the semantic pipeline. This can preferably be achieved without dropping client connection and without the client application restarting or being reconfigured. The semantic pipeline can provide considerable customization and policy enforced moderation without enforcing various implementation rules or guidelines for the underlying structure of individual components as shown in FIG. 15. The method functions to transparently act within the operations of an application—client code preferably does not need to be changed outside of configuration.

Block S310, which includes establishing policies, functions to receive and configure policies within a platform. Blocks S310 and S320 is preferably substantially similar to distribution of policy to the policy injectors as in Blocks S110 and S120, and any of the above variations and/or additions may similarly be used to facilitate setting and distributing policies to components. The policies are preferably set by an entity. Entities (e.g., a user account, administrator account, etc.) preferably have rules, privileges, permissions, or other defined capabilities that enable the entity to define at least one policy aspect. Policies may additionally or alternatively be imported from an existing policy store in the enterprise. A plurality of entities preferably collectively defines policies for various aspects of the platform. Policies may be defined for supported libraries, protocols, frameworks, or other suitable components of the platform. More preferably, the policies may define particular versions of the components that should be used. Similarly, policies may be defined for allowed or blocked actions. In one variation, action policies may be defined specifically for different roles or entities. For example, a policy may be defined that prohibits DROP and INSERT commands from being performed on a database on behalf of an application. Another policy may is that if an application ignores provided configuration about how to connect to a database, the TCP stream can be directed through a semantic pipeline regardless. The policies may be defined and communicated through a configuration file, retrieved through a control panel, retrieved over an application programming interface (API), or received in any suitable manner. As opposed to enforcing such policies in the implementation of platform components, the policies are preferably transparently injected in the inter-component operations of the platform. In other words, the policies may be applied without an application being aware of or making accommodations for the policies. A canonical form of policies can be hosted at an auth server or any suitable system for managing policies, but individual component policies are preferably published and maintained locally at semantic pipeline components. Each component (e.g., sender and receive of operational requests) may have a semantic pipeline. Alternatively, a semantic pipeline may be used only on the sender side, the receiver side or as an intermediary component.

Figure 16:
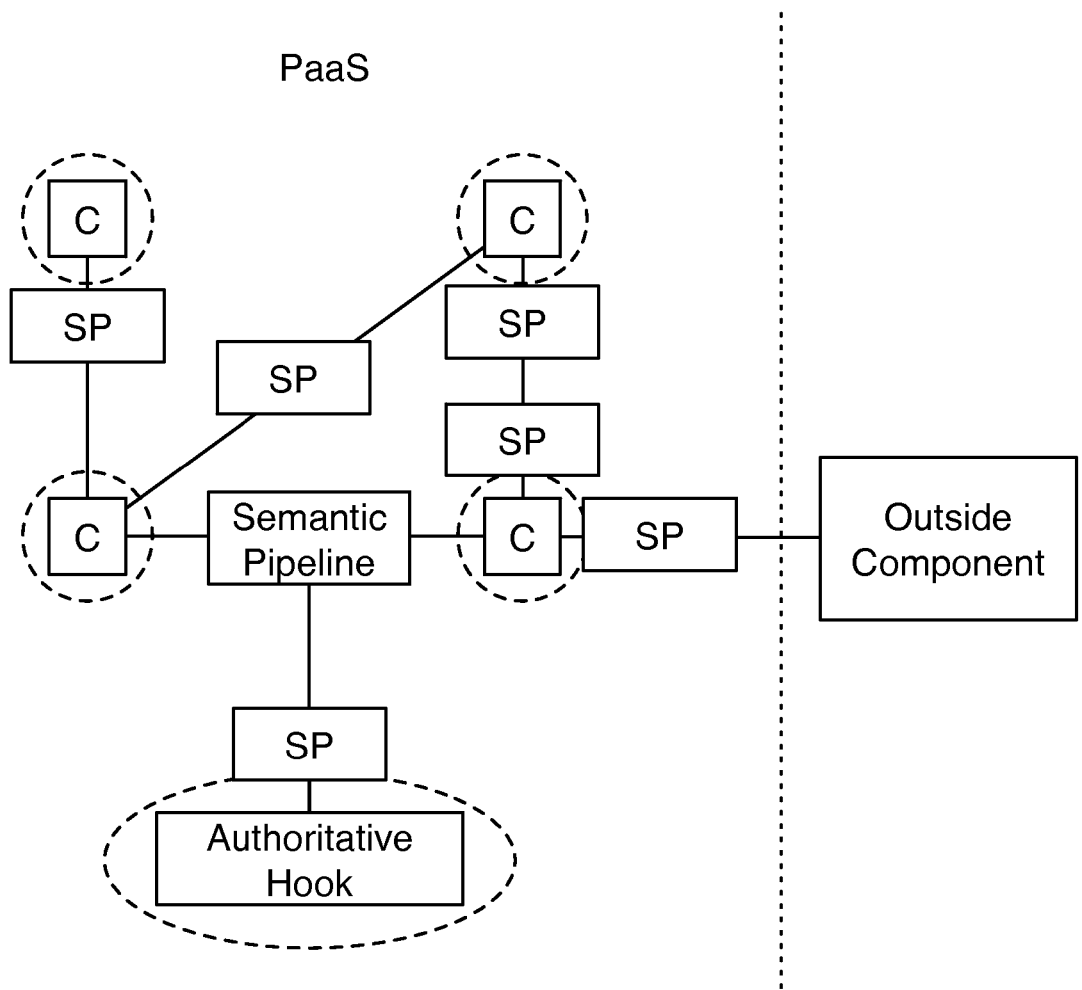
FIGS. 16 and 17 are exemplary architectures with semantic pipelines bound to different portions of communication.

Establishing the policies additionally determines the stages of a semantic pipeline. The semantic pipeline can be changed or augmented by a policy. Policies may be internally controlled and/or, controlled by outside entities. In one variation, setting a policy directly impacts a stage of a semantic pipeline. In another variation, a stage of a semantic pipeline may be configured or determined as a result of a policy being applied to a new or updated component such as in response to staging of a new component. For example, a semantic pipeline may be determined based on the staging pipeline results for a new application. A semantic pipeline is preferably an intermediary service for any component communication channel. The semantic pipeline may be bound to any portion of a communication channel as shown in FIG. 16. As an illustrative example of how a semantic pipeline may be defined for any component in the platform, even components used in the operation of a semantic pipeline such as a remote authoritative hook may have a semantic pipeline. Similarly an auth server, a staging pipeline and any suitable component may have a semantic pipeline. As mentioned before, the method may be employed within a PaaS system where outside customers (i.e., users) use the platform to run their various computing solutions. In this variation, some components are user components and other components are internal platform components used in operation of the platform. The platform components may be hidden from the user, but semantic pipelines can additionally be used on internal platform components.

Figure 17:
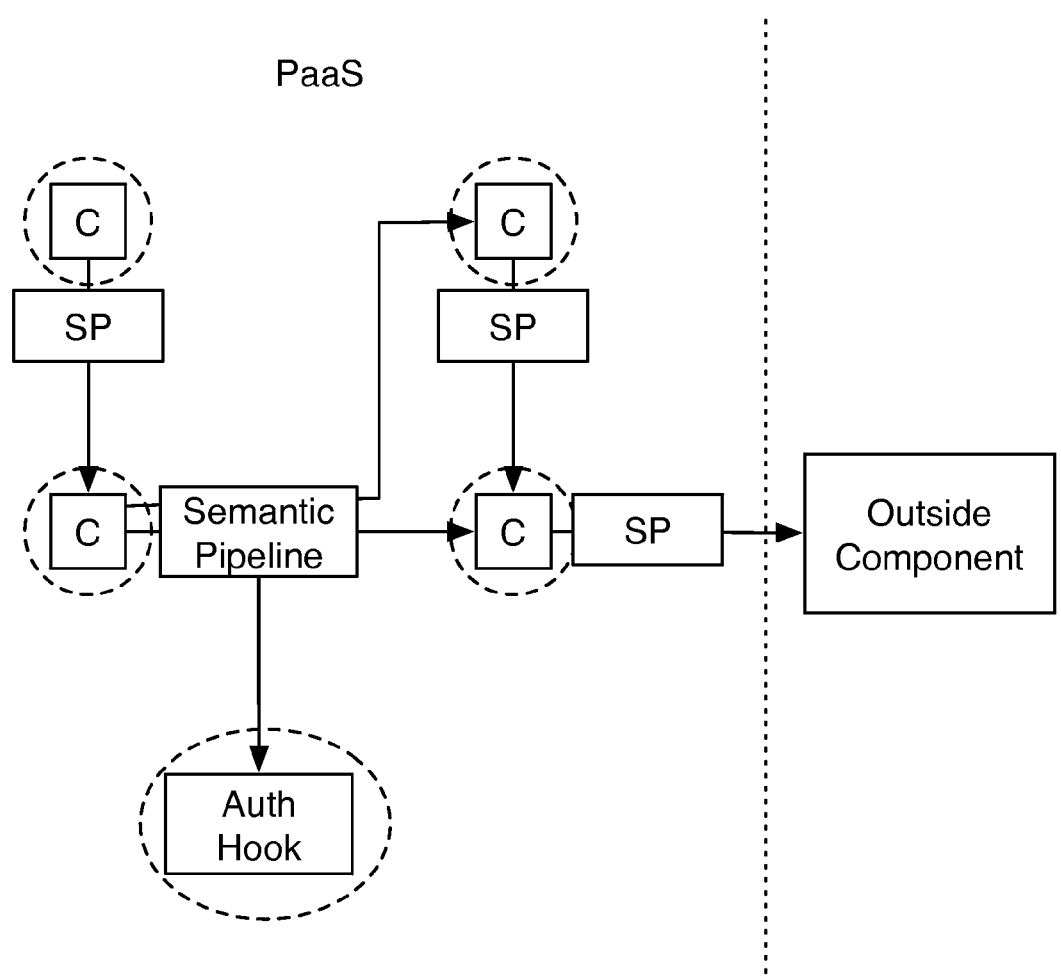

A semantic pipeline is preferably bound to outbound communications of a component as shown in FIG. 17—actions, jobs, and communications initiated by the component will pass through the bound semantic pipeline before being delivered to a destination. Alternatively, a semantic pipeline may be bound to the inbound communications of a component—actions, jobs, and communications directed at the component will be processed in the semantic pipeline prior to being received by the component. In one variation, inbound and outbound semantic pipelines may be used such that a communication will pass through at least two semantic pipelines. The bound semantic pipelines are preferably customized to the particular component. The semantic pipeline may alternatively be a general semantic pipeline. Semantic pipelines and/or individual stages of a semantic pipeline may be bound to communication patterns. The use of semantic pipelines is preferably substantially pervasive in the computing platform. In one variation, each user/customer staged component communicates through a semantic pipeline. In an alternative variation, a semantic pipeline is established and used for any component with active policy rules or configured semantic pipeline stages. For example, a semantic pipeline may be defined for all HTTP traffic or for all communications to a database.

Block 320, which includes isolating components of a platform, functions to provide component independence from outside components. While components may be implemented with the assumption of dependent components (e.g., configured databases and included libraries), the component is preferably isolated so that all dependencies can be controlled and adapted to platform policies within a semantic pipeline. Preferably each component or at least a substantial portion of components is implemented within an isolation container. The isolation container is preferably an operating system-level virtualization implementation (e.g., a Linux container). The isolation container may alternatively be any suitable mechanism for isolating or containing a component. Any suitable component may be placed in an isolation container such as an application, a database, an operating system, a server, a service, or any suitable component. Isolating the components preferably enables any suitable implementation to be used. As components are isolated and other dependent components are accessed through a transparent channel (e.g., the semantic pipeline), a wide variety of development tools can be used while still conforming to policies of a platform. This can provide flexibility to developers, IT departments, and platform administrators that may have various preferences for different programming languages and frameworks. Isolating the components can also enable enterprise level platforms to adapt to the quickly evolving landscape of development tools.

Block S330, which includes channeling communications of a component through a semantic pipeline functions to direct communication of a component through a platform defined process. The communication is preferably a form of operational request such as requesting information, responding to a request, communicating an instruction, or any suitable operational message between at least two components. Channeling outbound communication of a component preferably includes opening a network firewall of the component to direct traffic of the component through a semantic pipeline before the communication proceeds to the destination. From the perspective of the originating component, the communication is directed at the intended destination. However, the actual destination may not conform to the expectations of the initiating component. As described above, an application may expect and assume that it is communicating with a MySQL database, but the actual database may be a PostgreSQL database.

In the variation where a semantic pipeline is bound to the inbound communications of a component, the network firewall of the component is preferably configured to receive communications from the bound semantic pipeline. From the perspective of the component, the communication can appear to have been communicated directly from an originating component. That originating component may be the actual originating component or the originating component may be a synthesized originating component that is an artifact of the semantic pipeline. In one example, the user of a database may be an artificial user created by the semantic pipeline. An application may attempt to interact with a database using a first set of database credentials. The semantic pipeline, upon verifying the database credentials, may then use a separate set of database credentials to access the database. In the inbound and outbound communication scenarios, the existence and operations of the semantic pipeline is transparent to the component.

Block S340, which includes progressively processing a communication through the stages of the semantic pipeline, functions to process the communication at each stage of the semantic pipeline. A semantic pipeline preferably has at least one stage. The semantic pipeline may additionally have a plurality of stages as shown in FIG. 15. A stage is preferably controlled by a policy. As described above, a policy defined by an entity may directly impact a stage of a semantic pipeline. Alternatively, as a result of a policy, a stage may be configured. A communication is preferably sequentially processed by the stages of the semantic pipeline. The stages preferably have a configured order. Alternatively, the stages may be commutative (i.e., two stages can be processed in any sequential order and have the same result), be ordered based on the operation, or ordered in any suitable manner. In one variation, the semantic pipeline may not be a sequentially process of various stages. The communication may progress through the stages based on conditional logic. For example, a stage may be selectively processed based on the result of a proceeding stage. Processing a communication through the stages of the semantic pipeline preferably includes producing a processed communication as a result of the processing. The result can be an augmented or modified version of the communication, a translated version of the communication, an unmodified version, multiple versions of the communication (e.g., if delivered to multiple different destination components), or have any suitable form.

The stages of the semantic pipeline may be defined by a number of various entities. The operation or job of a stage may be to check the permissions or allowed behavior of a role, to transform or augment the communication, to delegate transformation of the communication to an outside service, to trigger an outside service, to record/log data, or perform any suitable task. The stages may be conditional where they are only activated for communication matching particular patterns. Preferably the policy rules can use namespaced addressing syntaxes to define processing stage of the semantic pipeline. As discussed above, the tokenized communication can be used to pass context between contexts and in some cases even communicate the initiator or involved components in the operational request. The content, data, or properties of the operational request can additionally be semantically processed. The pattern matching may be based upon regular expressions against the command. For example, a hook may be invoked through a regular expression match on an SQL statement. The stages may alternatively be applied to all communications. A stage or outside hook may look at each command inside a frame and aggregate results to pass a frame as a whole or not.

One type of semantic pipeline stage is a synchronous stage (i.e., inline stage). The synchronous stage may complete processing before allowing the communication to continue after the stage. More preferably, the synchronous stage completes a sufficient amount of processing to make a decision before allowing the communication to continue to the next stage. A synchronous stage can function to change, transform, or augment the communication. A synchronous processing stage preferably processes the original communication or the communication provided from another stage (which may have been augmented), and then the synchronous outputs an augmented form of the communication. In one exemplary use case, a stage may be defined to transform particular types of HTTP API requests. When the stage identifies that an HTTP is made to a particular API resource (e.g., URI), the stage may change the body of the HTTP request.

One particular type of a synchronous stage may be an authoritative hook, which functions to verify if a communication is allowed. The authoritative hook in one variation is a remote authoritative hook. The remote authoritative hook is preferably an outside component (e.g., a script or component within the platform or even a service outside the PaaS platform). In one variation, the semantic pipeline communicates with the remote authoritative hook over HTTP, but any suitable protocol may alternatively be used. In the variation where the authoritative hook is a script, the script providing the role policy can be easily maintained and updated by the entity responsible for that policy. The script can be written in languages such as Python, Perl, Ruby, or any suitable language, which functions to further give flexibility to the teams working with the platform. The authoritative hook may alternatively be an inline process that does not require calling out to a remote component. The remote authoritative hook can process the communication based on parameters of the communication, transaction, or job. In one example, the authoritative hook looks up if the requesting component has permissions to perform that action. If the communication is allowed, the authoritative hook responds confirming that the communication is allowed. If the communication is prohibited, the authoritative hook responds denying the communication, and the semantic pipeline preferably transmits a response to the originating component indicating the error. As another example, authorization credentials may be checked and converted to use internal credentials. For example, an application may provide credentials to access a database, however, due to the isolation of the components, the database as viewed by the application may not exist (at least not in the same setup as expected of the application). Within a stage of the semantic pipeline, the credentials are checked for being authentic for that application, and then actual credentials are substituted to access the actual database.

Figure 18A:
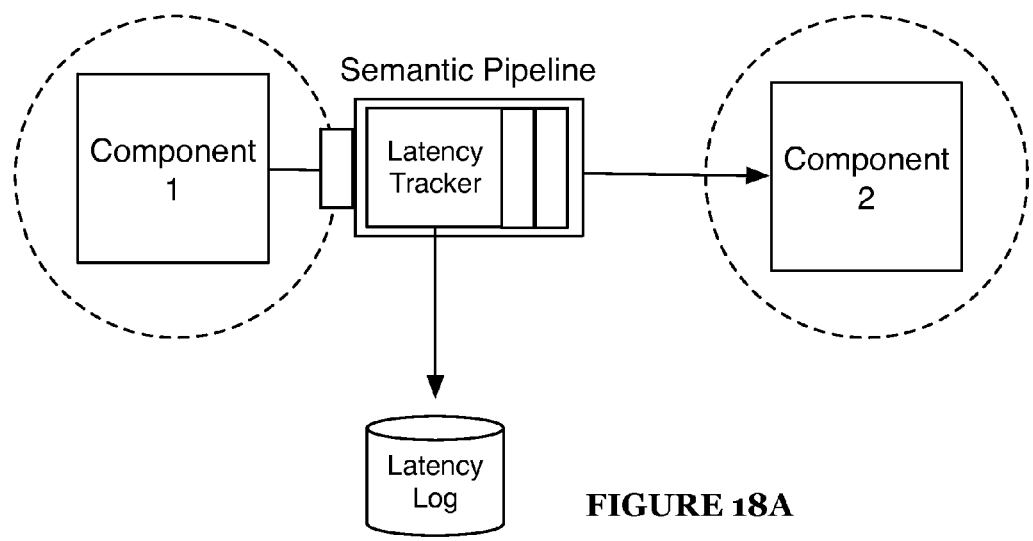
FIGS. 18A and 18B are schematic representations of processing a latency hook semantic pipeline stage.
Figure 18B:
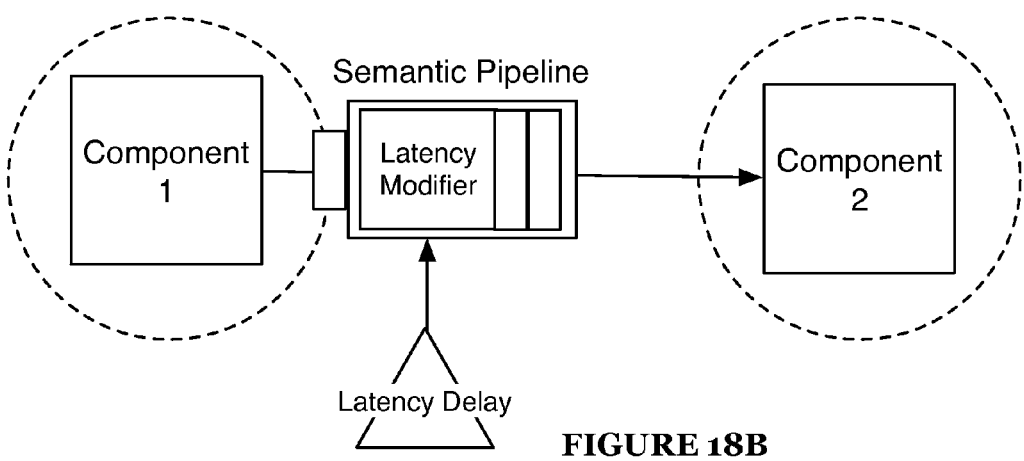

As another type of a synchronous stage may be a latency hook, which functions to track latency as shown in FIG. 18A. Latency tracking may be used to enable, supplement or facilitate, application performance management. The latency hook preferably records and logs latency measurements evident within the communications. Additionally, the latency hook may be used to perturb latency, which may be applicable to test and/or development environments as shown in FIG. 18B. Perturbing latency preferably includes delaying communication to simulate latency effects. Perturbing of latency can be beneficial to development environments. Perturbing latency can add fixed time delays to communication, add time delays to satisfy latency ranges, conditionally add latency, or make any suitable change to latency of a communication.

Additionally, the method may include triggering an action through a webhook. A request may be posted to a webhook, which can then trigger any suitable/arbitrary action based on the request. Processing a webhook stage preferably includes communicating all or a portion of information of the communication. The information is communicated to a designated or pre-defined webhook component. A policy defining a webhook stage can define an endpoint to direct information about the communication. In one variation, the endpoint is a URI, and when processing the webhook stage, information about the communication is sent to the URI over HTTP. The webhook component can be an outside application server resource, an internal component, a script, or any suitable triggerable endpoint. In one variation the webhook component can use the information about the communication to perform an outside action asynchronous to continued processing of the communication. In another variation, the webhook component can use the information to perform some customized logic and then returning a result to the semantic pipeline to synchronously alter the communication. For example, the webhook component could be configured to perform a customized translation or modification to the communication. The webhook component is preferably operated or provided from an outside entity such as the customer or a third party.

Another type of semantic pipeline stage may be an asynchronous stage, which functions to allow processing to occur without blocking the communication. Asynchronous stages preferably trigger an outside service or script to perform some task. Asynchronous stages are preferably for operations that are not required for the completion of the communication, and can be completed at a time after delivering the communication. Auditing and/or logging are exemplary use cases of an asynchronous stage. The communication is preferably read within the logging stage and then outputted to the next processing stage or if no more stages remain, to the output of the semantic pipeline.

Figure 19:
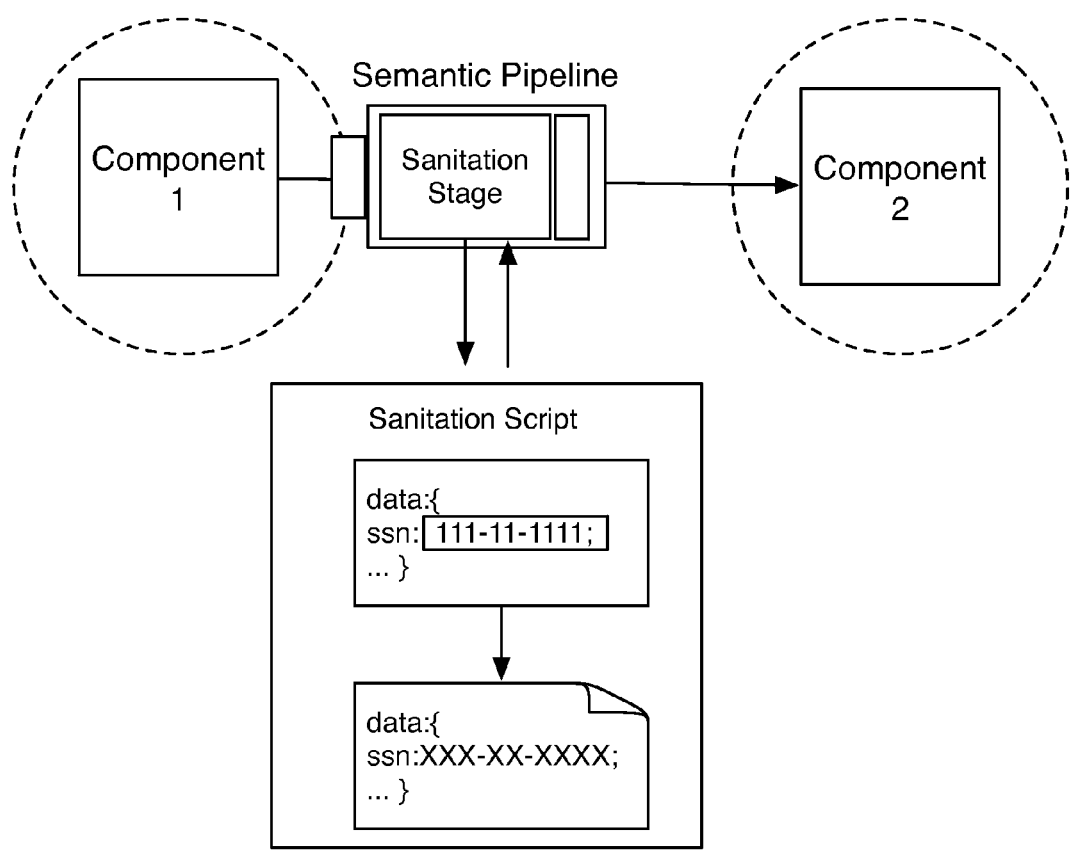
FIG. 19 is a schematic representation a stage of a semantic pipeline semantically interpreting the communication.

Additionally processing a communication through a stage of the semantic pipeline can include semantically interpreting the communication, which functions to use content analysis in processing the communication. Semantic interpretation can use regular expression, natural language processing, machine learning, or any suitable form of semantic interpretation to analyze content of the communication. Semantic interpretation comprises detecting string property values of communication parameters. In one variation, semantic interpretation is applied to sanitizing, redacting, or censoring a communication. For example, a stage of the semantic pipeline can be set to identify social security numbers patterns and to modify the content of the communication to anonymize the social security numbers as shown in FIG. 19. By configuring a policy to enable the social security stage sanitation stage, the environment could be insured that social security numbers from one component would not leak to other components regardless of the actions of the component. Combined with an auditing stage, audits could be performed to verify the social security number sanitation.

Figure 20:
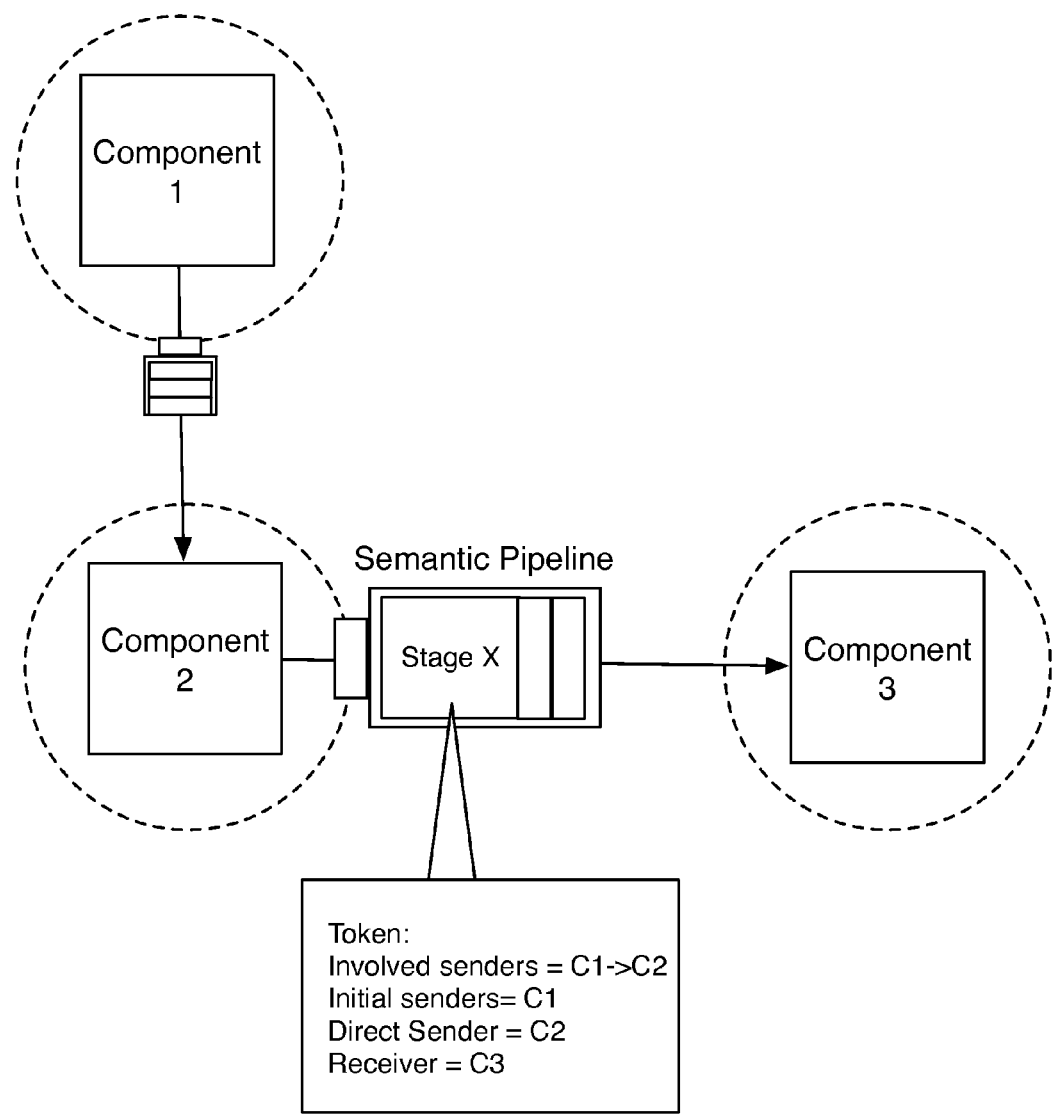
FIG. 20 is a schematic representation of enforcing policy in a stage according to involved parties of the communication.

In combination with the tokenized verification of senders, the semantic pipeline can additionally enforce policy in a stage according to involved parties of the communication. A communication, or more specifically an operational request, may have more involved components than the direct sender of the communication. There can be situations where one or more components may be indirectly instigators or otherwise involved in the communication. A token can embed contextual information of the involved parties so that a full chain of involved components is available to the semantic pipeline. Stages and the corresponding processing can be dependent on the indirectly involved components as well as the directly involved sending component. In one situation a first component may be prohibited from accessing a destination component and a second component may be allowed to interact with the destination component. The first component may attempt to use a second component to access a third component. But due to the validation tokens used in communicating between components and the passing of context through these tokens, the semantic pipeline (or any suitable policy injector) can make policy decisions according to the full chain of involved parties as shown in FIG. 20. So in the above situation, the policy prohibiting access can be enforced on the communications from the second component to prohibit communications triggered by the first component. Other suitable logic can be applied to enforce other policy restrictions.

Block S150, which includes delivering the communication to the destination component, functions to complete the communication. By passing the communication through the semantic pipeline before delivering the communication, policies, behaviors, and logging can be transparently enforced. The communication is preferably delivered to the destination component after having progressively processed the communication in the semantic pipeline, and the communication is delivered in accordance with the semantic pipeline. The communication may be delivered to a component originally intended by the originating component. However, the semantic pipeline may alternatively alter the type, version, number, or configuration of the destination component. Similarly, the communication may be modified by the semantic pipeline in any suitable manner. As was discussed above, delivering the communication to the destination component may include delivering the communication to a second semantic pipeline of a component. In one implementation, a semantic pipeline is used for each component, and inbound and outbound communication of a component passes through the semantic pipeline. Accordingly, a communication may go through the semantic pipeline of the sender and then the semantic pipeline of the receiver before completing delivery to the destination component. Additionally, the semantic pipeline may determine that the communication should be blocked or otherwise prevented. In this case the communication is not delivered to the destination component, which is in accordance with the processing result of the semantic pipeline. An error response or other suitable response could be transmitted to the sender.

Figure 21:
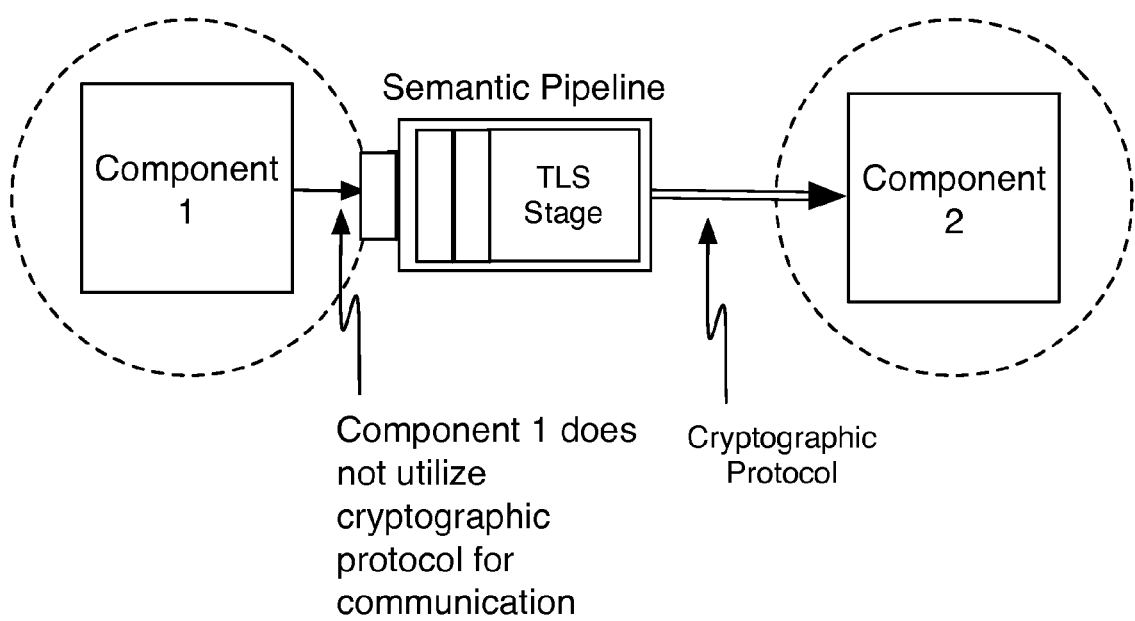
FIG. 21 is a schematic representation of upgrading a communication protocol of a component to a cryptographic transport protocol.

Additionally, the semantic pipeline can use transport layer security (TLS) to protect communication to a database or other suitable component without the client software having to support TLS. More generally a stage of the semantic pipeline can include upgrading to a cryptographic protocol in the communication between the semantic pipeline and the destination component. The stage of the semantic pipeline preferably applies semantic awareness to apply semantically aware upgrade instructions. The contents of the inter-component operational request can be semantically updated to invoke or enable upgraded security through the actual protocol. For example, during a MySQL communication handshake, parameters of the MYSQL communication can be changed and security features can be semantically spliced into the request to upgrade the communication. SSL or any suitable cryptographic transport protocol can similarly be used. Preferably, by placing the semantic pipeline on the same system as the client software, all off-machine database communications (e.g., PostgreSQL communications) gain TLS support as an intermediary component upgrade as shown in FIG. 21. The TLS support is preferably achieved without requiring client software modification. As a result, security policy can be enforced. Furthermore, certificate verification may be performed under the control of the policy engine, permitting improvements beyond what might be supported by the client application.

As an additional variation statistics and data may be exported from the semantic pipeline. The statistics may be exported periodically, based on an API request, an HTTP request, or based on any suitable prompt. The statistics may additionally be gathered without the context of client requests, which functions to permit tracking of consumption patterns without the client application having to be restarted or reconfigured.

In one exemplary use case, a semantic pipeline may be defined for communication between a PostgreSQL admin service and a PostgreSQL database. The PostgreSQL admin service is preferably isolated and given the IP port for the associated semantic pipeline. Instructions for the PostgreSQL database are preferably transmitted to the semantic pipeline. A first stage may be an inline rewrite of the connect credentials for the database. The inline rewrite is preferably a semantically aware rewrite authentication/authorization credentials. The presence of authentication from an originating component can be detected and automatically changed to credentials established at the semantic pipeline for the destination component—a first set of credentials can be used between a originating component and the semantic pipeline and a second set of credentials can be used between the semantic pipeline and the destination component. The act of swapping credentials or invoking secondary credentials can be transparent to the originating component and the destination component. Semantic aware changing of authentication credentials can enable to allow access to a component without exposing credentials to the component. The credentials supplied by the PostgreSQL admin service are verified, and if valid, the credentials are substituted with credentials generated by the platform for the actual PostgreSQL database. As a second stage, an asynchronous logging process can log the frontend, backend, and total latency. Additionally, the latency of synchronous hooks and stages may be logged. A third stage may be an authoritative hook to a python script. The python script may be configured by an entity to prevent DROP and INSERT commands from the PostgreSQL admin service. A fourth stage may be an asynchronous hook for an audit log, such that all actions of the PostgreSQL admin service can be tracked.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the PaaS infrastructure. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method for transforming inter-communications in a computing platform comprising:
   instantiating a set of isolated components, wherein each isolated component of the set of isolated components is individually isolated within a dedicated operating system level virtualization container;
   to each of the isolated components of the set of isolated components, binding a respective semantic pipeline, wherein each respective semantic pipeline is bound as a dedicated semantic pipeline to a respective one of the isolated components;
   establishing platform policies, the establishing comprising, for each of the semantic pipelines of the set of isolated components, defining a set of stages for the semantic pipeline, the set of stages being defined by the platform policies, each respective semantic pipeline for evaluating communications involving the isolated component to which it is bound, and each respective semantic pipeline for applying the platform policies to the communications, wherein the platform policies include, for each of one or more of the semantic pipelines, at least one rule policy for evaluating requested communications from a requesting one of the isolated components to a destination one of the isolated components, the rule policy determining whether requested communications are allowed or denied based on one or both of the requesting component and the destination component;

channeling communications of each of the isolated components through the respective semantic pipeline bound to the isolated component;

progressively processing a communication of one of the isolated components through the stages of the respective semantic pipeline; and delivering the processed communication to a destination component in accordance with the platform policies, such that all communications from the one of the isolated components to the destination component are delivered through the respective semantic pipeline.

2. The method of claim 1, wherein binding a semantic pipeline comprises binding the semantic pipeline to outbound communications of at least one of the isolated components.

3. The method of claim 1, wherein binding a semantic pipeline comprises binding the semantic pipeline to inbound communications of at least one of the isolated components.

4. The method of claim 1, wherein progressively processing a communication through stages of the semantic pipeline comprises executing at least one processing stage defined by a first component policy rule, wherein the communication is an inter-component operational request.

5. The method of claim 4, wherein progressively processing a communication through stages of the semantic pipeline further comprises executing at least a second processing stage defined by a second component policy rule.

6. The method of claim 5, wherein executing the first and second stages of the semantic pipeline are commutative.

7. The method of claim 4, wherein executing the at least one processing stage comprises synchronously processing the communication and outputting a synchronously processed communication.

8. The method of claim 7, wherein the at least one processing stage is an authoritative stage; and wherein synchronously processing the communication comprises verifying authorization to complete the communication.

9. The method of claim 7, wherein the at least one processing stage is a latency tracking stage; and wherein synchronously processing the communication comprises logging latency measurements evident with the communication.

10. The method of claim 7, wherein the at least one processing stage is a latency altering stage; and wherein synchronously processing the communication comprises perturbing latency of the communication.

11. The method of claim 4, wherein executing the at least one processing stage comprises triggering communication to an outside component.

12. The method of claim 4, wherein executing the at least one processing stage comprises asynchronously processing the communication and outputting a processed communication.

13. The method of claim 12, wherein asynchronously processing the communication comprises logging the communication.

14. The method of claim 4, wherein executing the at least one processing stage comprises semantically interpreting the communication.

15. The method of claim 14, wherein semantically interpreting the communication comprises detecting string property values of communication parameters.

16. The method of claim 14, wherein executing the at least one processing stage comprises executing a semantically aware authentication rewrite of authentication in the communication.

17. The method of claim 14, wherein semantically interpreting the communication comprises detecting a flagged property value; and wherein executing the at least one processing stage further comprises sanitizing the flagged property value.

18. The method of claim 4, wherein executing the at least one processing stage comprises analyzing involved components in the communication.

19. The method of claim 1, wherein delivering the processed communication to the destination component comprises upgrading to a cryptographic protocol in the communication between the semantic pipeline and the destination component.

20. The method of claim 19, wherein the upgrade requires semantically aware upgrade instructions.

21. The method of claim 1, wherein binding a semantic pipeline comprises opening a firewall of the operating system level virtualization container to the dedicated semantic pipeline.

22. The method of claim 1, wherein channeling communication comprises filtering packet communication through the dedicated semantic pipeline.

23. The method of claim 1, wherein delivering the processed communication to the destination component in accordance with the semantic pipeline comprises:

channeling communication to the destination component through a second semantic pipeline of the destination component, wherein the second semantic pipeline is a dedicated pipeline bound to the destination component;

progressively processing the communication through a set of stages of the second dedicated semantic pipeline; and delivering communication processed by the second semantic pipeline to the destination component.

* * * * *